United States Patent
Paz et al.

(10) Patent No.: US 12,483,283 B2
(45) Date of Patent: Nov. 25, 2025

(54) POWER CHARACTERISTICS REPORTING FOR SIGNALING USING SINGLE CARRIER MODULATION

(71) Applicant: QUALCOMM Incorporated, San Diego, CA (US)

(72) Inventors: Daniel Paz, Geva Carmel (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 968 days.

(21) Appl. No.: 17/592,234

(22) Filed: Feb. 3, 2022

(65) Prior Publication Data

US 2023/0246657 A1 Aug. 3, 2023

(51) Int. Cl.
 *H04B 1/04* (2006.01)
 *H04L 1/00* (2006.01)
 *H04W 52/02* (2009.01)
 *H04W 52/50* (2009.01)

(52) U.S. Cl.
 CPC ....... *H04B 1/04* (2013.01); *H04B 2001/0416* (2013.01)

(58) Field of Classification Search
 None
 See application file for complete search history.

(56) References Cited

U.S. PATENT DOCUMENTS

| | | | |
|---|---|---|---|
| 8,432,224 B1 * | 4/2013 | Woo | H03F 1/0238 330/285 |
| 8,891,390 B2 * | 11/2014 | Kanzaki | H04B 7/0426 370/252 |
| 11,218,973 B2 * | 1/2022 | Aio | H04W 76/19 |
| 2009/0129257 A1 * | 5/2009 | Maltsev | H03F 1/0205 370/208 |
| 2014/0140438 A1 * | 5/2014 | Silverman | H04B 7/0426 375/299 |
| 2018/0294997 A1 * | 10/2018 | Lee | H04L 25/0204 |
| 2018/0324709 A1 * | 11/2018 | Chang | H04W 52/24 |
| 2019/0058545 A1 | 2/2019 | Chen et al. | |
| 2019/0059060 A1 | 2/2019 | Chen et al. | |

OTHER PUBLICATIONS

International Search Report and Written Opinion—PCT/US2023/060475—ISA/EPO—May 10, 2023.

* cited by examiner

*Primary Examiner* — Pablo N Tran
(74) *Attorney, Agent, or Firm* — Kevin M. Donnelly; Holland & Hart LLP

(57) ABSTRACT

Methods, systems, and devices for wireless communications are described. A transmitting device may operate in a non-linear region of a power amplifier by reporting an indication of power amplifier characteristics and backoff values to a receiving device. The indication of the power amplifier characteristics and the backoff values may be based on power amplifier operation in the non-linear region of power amplifier characteristic curves. The transmitting device may transmit, to the receiving device, signaling using a single carrier waveform at a transmission power in the non-linear region of the power amplifier characteristic curves based on the indication. The receiving device may receive the signaling and use the power amplifier characteristics and the backoff values to perform debiasing and nonlinearity corrections to recover the original signaling.

30 Claims, 16 Drawing Sheets

POWER CHARACTERISTICS REPORTING FOR SIGNALING USING SINGLE CARRIER MODULATION

TECHNICAL FIELD

The following relates to wireless communications, including power characteristics reporting for signaling using single carrier modulation.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include multiple base stations or multiple network access nodes, each simultaneously supporting communication for multiple communication devices, which may be otherwise known as user equipment (UE). Some of the communication devices may apply large power backoff values to a transmission power of a signal to avoid a power amplifier operating in a non-linear region. In some cases, however, by applying the large power backoff values the communication devices (for example, the UEs) may limit a maximum or average transmission power of the signal, coverage area range, and data rate. As such, the wireless multiple-access communications system may have low transmission power efficiency and may not provide coverage for the multiple communication devices.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a first device. The method may include transmitting, to a second device, a message indicating a set of power amplifier characteristics and a set of power backoff values for each of one or more modulation configurations of the first device, the set of power backoff values being associated with a non-linear region of power amplifier characteristic curves of the first device and transmitting, to the second device, based on transmitting the message indicating the set of power amplifier characteristics and the set of power backoff values, signaling using a single carrier waveform at a transmission power in the non-linear region of the power amplifier characteristic curves based on applying one or more power backoff values of the set of power backoff values.

Another innovative aspect of the subject matter described in this disclosure can be implemented in an apparatus for wireless communications at a first device. The apparatus may include a processor, memory coupled with the processor, and instructions stored in the memory. The instructions may be executable by the processor to cause the apparatus to transmit, to a second device, a message indicating a set of power amplifier characteristics and a set of power backoff values for each of one or more modulation configurations of the first device, the set of power backoff values being associated with a non-linear region of power amplifier characteristic curves of the first device and transmit, to the second device, based on transmitting the message indicating the set of power amplifier characteristics and the set of power backoff values, signaling using a single carrier waveform at a transmission power in the non-linear region of the power amplifier characteristic curves based on applying one or more power backoff values of the set of power backoff values.

Another innovative aspect of the subject matter described in this disclosure can be implemented in an apparatus for wireless communications at a first device. The apparatus may include means for transmitting, to a second device, a message indicating a set of power amplifier characteristics and a set of power backoff values for each of one or more modulation configurations of the first device, the set of power backoff values being associated with a non-linear region of power amplifier characteristic curves of the first device and means for transmitting, to the second device, based on transmitting the message indicating the set of power amplifier characteristics and the set of power backoff values, signaling using a single carrier waveform at a transmission power in the non-linear region of the power amplifier characteristic curves based on applying one or more power backoff values of the set of power backoff values.

Another innovative aspect of the subject matter described in this disclosure can be implemented in a non-transitory computer-readable medium storing code for wireless communications at a first device. The code may include instructions executable by a processor to transmit, to a second device, a message indicating a set of power amplifier characteristics and a set of power backoff values for each of one or more modulation configurations of the first device, the set of power backoff values being associated with a non-linear region of power amplifier characteristic curves of the first device and transmit, to the second device, based on transmitting the message indicating the set of power amplifier characteristics and the set of power backoff values, signaling using a single carrier waveform at a transmission power in the non-linear region of the power amplifier characteristic curves based on applying one or more power backoff values of the set of power backoff values.

One innovative aspect of the subject matter described in this disclosure can be implemented in a method for wireless communication at a first device. The method may include receiving, from a second device, a message indicating a set of power amplifier characteristics and a set of power backoff values for each of one or more modulation configurations of the second device, the set of power backoff values being associated with a non-linear region of power amplifier characteristic curves of the second device and receiving, from the second device based on receiving the message, signaling using a single carrier waveform at a transmission power in the non-linear region of the power amplifier characteristic curves based on a modulation configuration of the signaling and the set of power amplifier characteristics and the set of power backoff values.

Another innovative aspect of the subject matter described in this disclosure can be implemented in an apparatus for wireless communications at a first device. The apparatus may include a processor, memory coupled with the processor, and instructions stored in the memory. The instructions may be executable by the processor to cause the apparatus to receive, from a second device, a message indicating a set of power amplifier characteristics and a set of power backoff values for each of one or more modulation configurations of the second device, the set of power backoff values being associated with a non-linear region of power amplifier characteristic curves of the second device and receive, from the second device based on receiving the message, signaling using a single carrier waveform at a transmission power in the non-linear region of the power amplifier characteristic curves based on a modulation configuration of the signaling and the set of power amplifier characteristics and the set of power backoff values.

Another innovative aspect of the subject matter described in this disclosure can be implemented in an apparatus for wireless communication at a first device. The apparatus may include means for receiving, from a second device, a message indicating a set of power amplifier characteristics and a set of power backoff values for each of one or more modulation configurations of the second device, the set of power backoff values being associated with a non-linear region of power amplifier characteristic curves of the second device and means for receiving, from the second device based on receiving the message, signaling using a single carrier waveform at a transmission power in the non-linear region of the power amplifier characteristic curves based on a modulation configuration of the signaling and the set of power amplifier characteristics and the set of power backoff values.

Another innovative aspect of the subject matter described in this disclosure can be implemented in a non-transitory computer-readable medium storing code for wireless communications at a first device. The code may include instructions executable by a processor to receive, from a second device, a message indicating a set of power amplifier characteristics and a set of power backoff values for each of one or more modulation configurations of the second device, the set of power backoff values being associated with a non-linear region of power amplifier characteristic curves of the second device and receive, from the second device based on receiving the message, signaling using a single carrier waveform at a transmission power in the non-linear region of the power amplifier characteristic curves based on a modulation configuration of the signaling and the set of power amplifier characteristics and the set of power backoff values.

DETAILED DESCRIPTION

Figure 1:
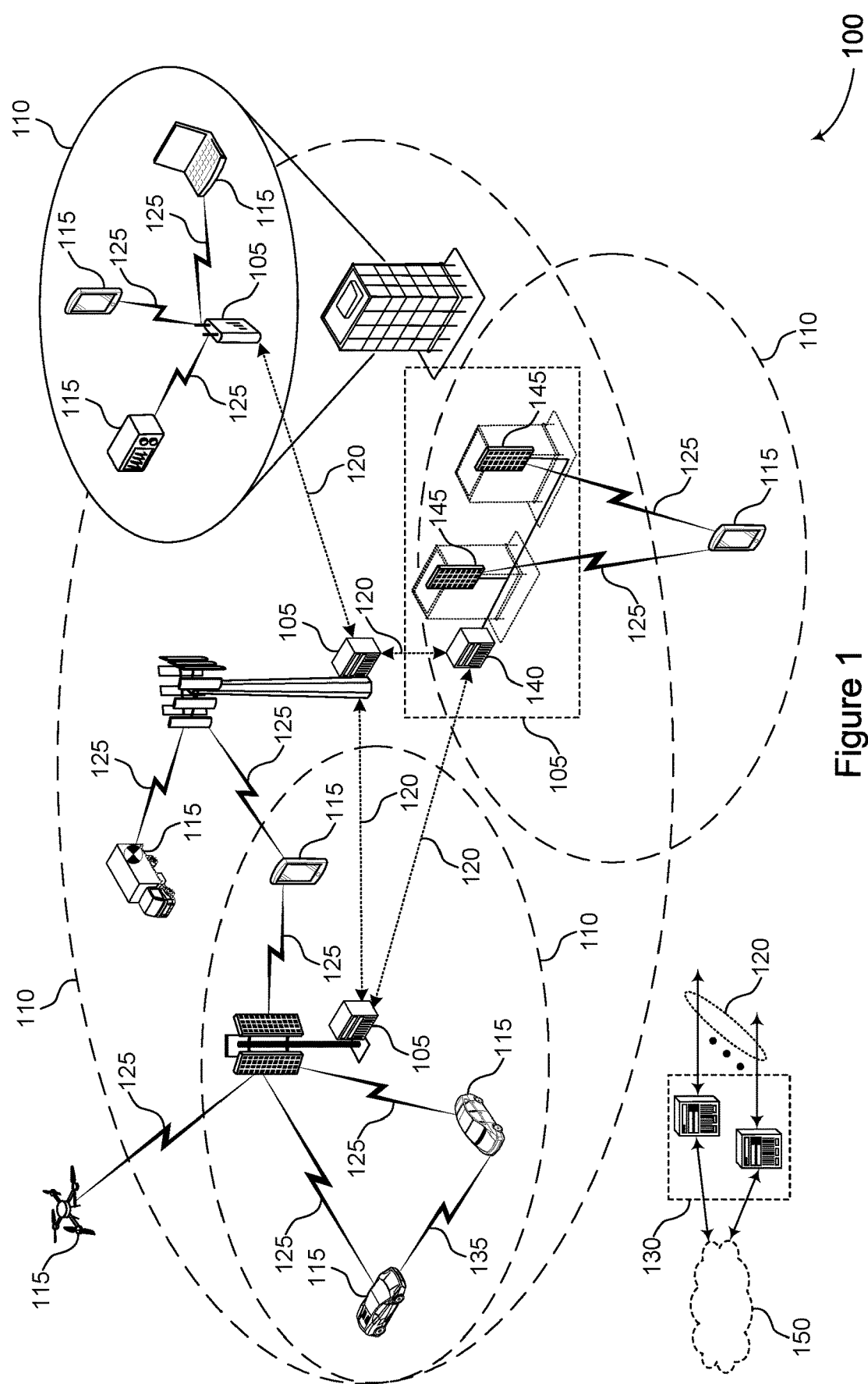
FIGS. 1 and 2 illustrate examples of wireless communications systems that support power characteristics reporting for signaling using single carrier modulation in accordance with aspects of the present disclosure.

In some wireless communications systems, a transmitting device (for example, a user equipment (UE) or a base station) may apply a power backoff value, effectively reducing the transmission power, to avoid operating a power amplifier in a non-linear region. For example, the transmitting device may determine the power backoff value based on one or more power amplifier characteristic curves (for example, an amplitude modulation (AM)/AM curve or an AM/phase modulation (PM) curve) of the power amplifier. In some cases, a power backoff value for a symbol of a signal may be based on different modulation configurations for the signal, such as a modulation and coding scheme (MCS) of the signal or constellation type of the signal (for example, quadrature phase-shift keying (QPSK) or amplitude phase-shift keying (APSK)). Different modulation configurations may result in different operating points on the power amplifier characteristic curves, and the transmitting device may apply different power backoff values to operate in the non-linear region of the power amplifier characteristic curves for different modulation configurations. The power amplifier characteristic curves may each include a linear region, corresponding to lower transmission power, a non-linear region, and a saturation region, the non-linear and saturation regions corresponding to higher transmission power. Operating in the non-linear region, however, may lead to lower signal quality (for example, due to error vector magnitude (EVM) deterioration caused by intra-band or inter-band emissions). In some scenarios or deployments, the transmitting device may use a large power backoff value to ensure power amplifier operation in the linear region. However, the large power backoff value may limit the maximum or average transmission power of the signal, coverage area range, data rate, or rate-over-range characteristics. In some other scenarios or deployments, the transmitting device may use a higher quality power amplifier having an extended linear range, but such power amplifiers may be included in only high-end devices, not in "lite" or lower capability devices. In some other scenarios or deployments, the transmitting device may use other, different non-linearity correction or pre-compensation methods (for example, digital pre-distortion (DPD) or digital post-distortion (DPOD)), but these techniques may require increased complexity associated with at least the addition of a pre-distorter or a post-distorter component. A transmitting device in some scenarios or deployments may use a single carrier waveform to transmit signaling, which may have lower complexity compared to other waveforms, such as multicarrier waveforms. For example, each constellation point or modulated symbol may be transmitted separately in time for a single carrier waveform. For some scenarios or deployments of uplink signaling using a single carrier waveform, each power amplifier may operate on a signal originating from a single UE. Therefore, signaling using a single carrier waveform may allow for other non-linearity correction or pre-compensation methods related to the present disclosure.

Various aspects generally relate to single carrier waveforms, and more specifically, to techniques that enable a transmitting device (for example, a UE or a network entity such as a base station) to operate its power amplifiers in non-linear regions of respective associated power amplifier characteristic curves. In some examples, the transmitting device may report, to a receiving device (for example, a UE or a network entity such as a base station), indications of a set of power amplifier characteristics (for example, one or more characteristics of each of one or more power amplifier characteristic curves associated with one or more respective power amplifiers of the transmitting device) and a set of power backoff values (for example, a respective power backoff value for each of one or more of the power amplifier characteristic curves for each of one or more modulation configurations for a single carrier waveform (for example, modulation orders, modulation and coding schemes (MCSs), constellation radius, or constellation types)). The set of power backoff values are selected so as to allow for power amplifier operation in the non-linear regions of the associated power amplifier characteristic curves. The transmitting device may then transmit, to the receiving device, using one or more of its power amplifiers, signaling (for example, uplink or downlink control or data signaling) using a single carrier waveform at a transmission power in the non-linear regions of the respective power amplifier characteristic curves based on the set of power backoff values. The receiving device may receive the signaling and use the previously-indicated set of power amplifier characteristics and the set of power backoff values to perform operations, such as debiasing and nonlinearity corrections, to recover or approximate the original signaling.

Particular aspects of the subject matter described herein may be implemented to realize at least one or more of the following potential advantages. The techniques employed by the described communication devices (for example, UEs or network entities such as base stations) may enable the use of a higher transmission power while maintaining relatively low complexity. For example, operations performed by a transmitting device may enable an increase in transmission power because the transmitting device operates its power amplifiers in non-linear regions and indicates a set of power amplifier characteristics or a set of backoff values to the receiving device such that the receiving device can perform debiasing or nonlinearity correction techniques without requiring either the transmitting device or the receiving device to include additional components or use relatively more complex algorithms. Due to the transmitting device using a single carrier waveform, where constellation points or modulated symbols of a signal are transmitted separately in time, a receiving device may recover the original constellation points from the received signal with low complexity. Because of the increase in transmission power, operations performed by the described communication devices may also support improvements to overall coverage and data rates, among other benefits.

Aspects of the disclosure are initially described in the context of wireless communications systems. Aspects of the disclosure are then described in the context of system diagrams and process flows. Aspects of the disclosure are further illustrated by and described with reference to apparatus diagrams, system diagrams, and flowcharts that relate to power characteristics reporting for signaling using single carrier modulation.

FIG. 1 illustrates an example of a wireless communications system 100 that supports power characteristics reporting for signaling using single carrier modulation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may support techniques for a transmitting device to apply a power backoff to a transmission power avoid operating in a non-linear region of a power amplifier for a transmit chain of the transmitting device. In some cases, operating in the non-linear region may lead to EVM deterioration from intra-band and inter-band emissions or spectral re-growth. The backoff value may be based on AM/AM and AM/PM characteristic curves of the power amplifier. The AM/AM characteristic curve may correspond to an amplitude/power amplifier gain deviation of the signal at the power amplifier output, based on a non-linear behavior of the power amplifier, as a function of the amplitude of the signal at the power amplifier input. The AM/PM characteristic curve may correspond to a phase deviation of the signal at the power amplifier output, based on the non-linear behavior of the power amplifier, as a function of the amplitude of the signal at the power amplifier input. An example of AM/AM and AM/PM characteristic curves are described in more detail with reference to FIG. 3A.

Using a high backoff value may result in operation in the linear region of the power amplifier response, but using a high backoff value may also limit a maximal and average transmission power. The reduced maximal and average transmission power may result in limited coverage and data rate.

Some wireless communications systems, such as the wireless communications system 100, may implement techniques to operate with a higher transmit power or by using lower power backoff values, which may result in non-linear power amplifier operation. Some systems may use higher quality power amplifiers with an extended linear range. However, some systems implementing lite or lower capability devices may not use higher quality power amplifiers.

Some wireless communications systems may use low peak-to-average power (PAPR) waveforms, such as single carrier waveforms or single carrier FDM waveforms, with low PAPR constellations such as phase shift keying (PSK) or amplitude phase shift keying (APSK) constellations. However, spectral efficiency with PSK may be limited, and APSK may achieve spectral efficiency similar to high order quadrature amplitude modulation (QAM) constellations with a lower PAPR. In some cases, APSK may be resilient to pseudorandom noise or common phase error compared to some QAM constellations. For example, single carrier APSK, rather than QAM or PSK, may be used for satellite communications because of the better spectral efficiency compared to PSK and a higher resistance to distortion compared to QAM (for example, due to a configuration of concentric rings). In some cases, APSK constellations may be used for sub-terahertz wave systems and other high frequency systems, such as systems using millimeter wave signaling or satellite link signaling.

The wireless communications system 100 may implement techniques to use a low backoff value such that instantaneous transmission power reaches the non-linear region of the power amplifier or approaches the saturation region of the power amplifier. These techniques may enable higher transmission power, which may lead to wider coverage or rate over range characteristics. Transmission in the non-linear region may result in a received waveform, such as a received single carrier waveform at a receiving device to be compressed in the amplitude domain and rotated in the phase domain according to instantaneous signal power and modulated symbol amplitude.

However, in examples in which the receiving device has information for the AM/AM and AM/PM curves of the transmitting device as well as the set of power backoff values applied by the transmitting device, the receiving device may correct or unbiased the received signaling to recover the originally transmitted constellation or signaling. For example, the receiving device may apply a distortion correction or unbiasing in the in-phase and quadrature-phase (I/Q) domain side per constellation radius to recover the originally transmitted constellation. These techniques may be implemented by low capability or low complexity devices or devices with memoryless, near-memoryless, or quasi-memoryless power amplifiers. Some other techniques for debiasing or nonlinearity corrections, or generic power amplifier non-linearity correction or pre-compensation methods such as DPD or DPoD, may not be implemented by low capability or low complexity devices due to higher complexity.

To enable a transmitting device to use a lower power backoff value and operate in the non-linear region of the power amplifier, the wireless communications system 100 may support techniques for the transmitting device to indicate characteristics of power amplifier curves and selected set of power backoff values. For example, the transmitting device may indicate, to a receiving device, characteristics of AM/AM and AM/PM curves of a power amplifier of the transmitting device. The transmitting device may also indicate a set of power backoff values used to transmit signaling while operating in the non-linear region of a power amplifier of the transmitting device. The receiving device may use the reported information to recover the originally transmitted constellation with low complexity in examples in which the transmitting device operates using lower power backoff values and in a non-linear region of the power amplifier.

In some examples, the transmitting device may indicate a set of power backoff values for different modulation configurations. For example, the transmitting device may select a set of power backoff values for different modulation orders, MCSs, constellation radiuses, and constellation types, such that symbols corresponding to an outer ring of a constellation are within the non-linear region of the power amplifier while avoiding entering a deep saturation region of the power amplifier. The transmitting device may indicate the selected set of power backoff values for the different modulation configurations such that the receiving device may recover the original constellation for multiple different modulation configurations used by the transmitting device. In some examples, the transmitting device may indicate characteristics for multiple different power amplifier curves, such as power amplifier characteristic curves at different temperatures of the transmitting device. A temperature of the power amplifier may change the characteristics of the power amplifier characteristic curves, so the transmitting device may indicate the characteristics for various temperatures. In some examples, the transmitting device may indicate characteristics for power amplifier characteristic curves for different antenna panels, antenna ports, power amplifiers, polarizations, or any combination thereof.

In some implementations, these techniques may be implemented for single carrier waveforms. For example, the nonlinearity correction techniques may be efficient for single-carrier waveforms, such as single carrier APSK waveforms, or low rank (For example, rank one) signaling. However, these techniques may also be implemented for other types of constellations, such as QAM constellations. In some implementations, these techniques may be implemented for uplink signaling in which each power amplifier operates on a signal originating from a single UE or power amplifier, or in which each power amplifier is associated with a single user data. In some implementations, these techniques may be implemented for single layer signaling, or in which a power amplifier amplifies a single layer signal. For example, rank one signaling may be used for uplink signaling or signaling using a single carrier or single carrier OFDM waveform. These techniques may also be implemented for downlink signaling. For example, in some sub-terahertz systems, downlink may address a single user at a time. In some cases, each UE may be addressed via a dedicated radio frequency chain and each power amplifier may have a single layer signal, not a mixture of precoded layers, for single carrier downlink transmission. However, these techniques may also be implemented for higher layer signaling transmission per power amplifier.

These techniques may provide greater rate over range characteristics and may be implemented by any type of transmitting device. For example, these techniques may be implemented by network entities, base stations 105, or UEs 115, including low cost or low complexity UEs 115. These techniques may be implanted in sub-terahertz bands, such as Frequency Range 4 (FR4) and Frequency Range 5 (FR5) bands, and non-terrestrial networks (NTNs), including examples in which pseudo-random noise may affect performance. For example, in NTNs, satellite links may experience mitigated performance due to satellite altitude resulting in a long hop or transmission distance. The increased transmit power provided by these techniques may mitigate performance drops from the long transmission distance. For systems communicating on sub-terahertz bands, the higher transmission power may reduce link delay.

Figure 2:
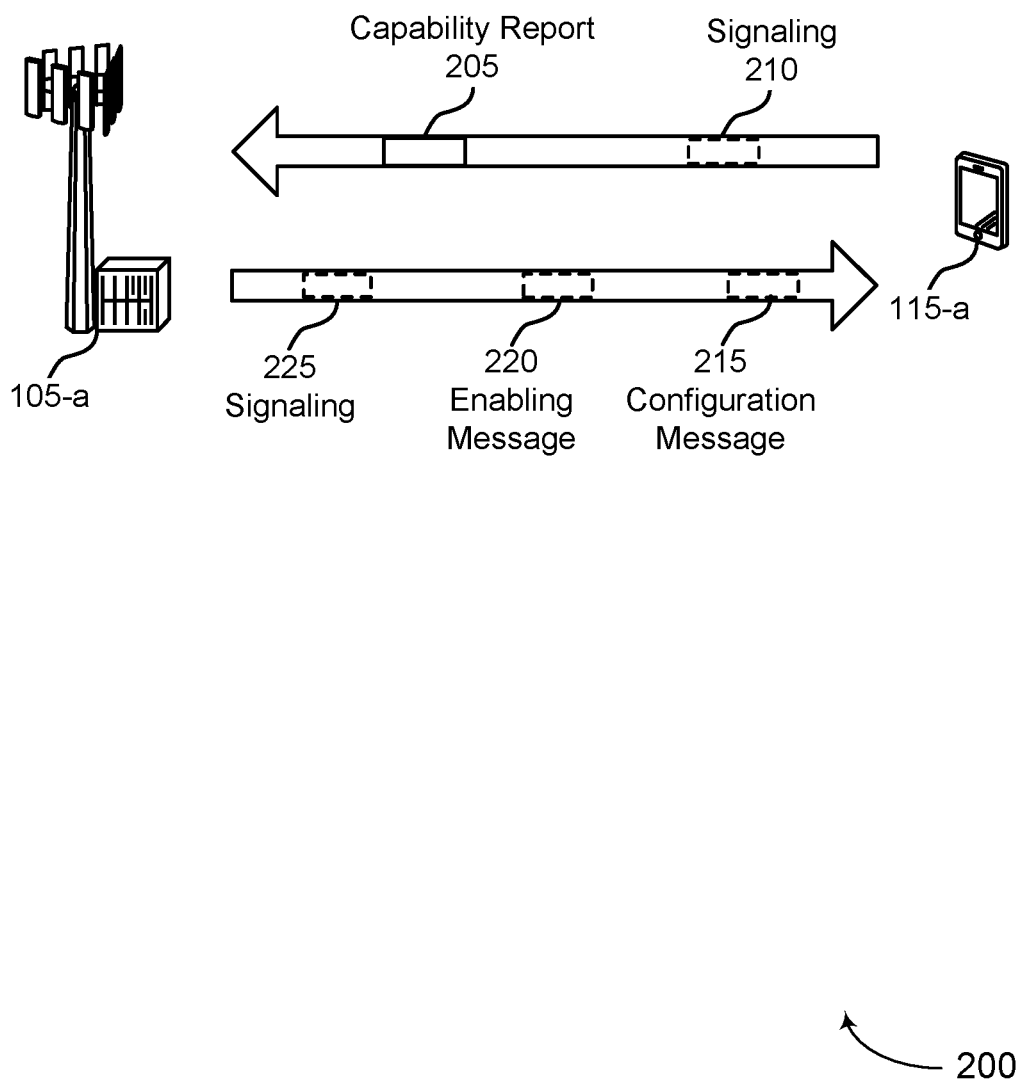

FIG. 2 illustrates an example of a wireless communications system 200 that supports power characteristics reporting for signaling using single carrier modulation in accordance with aspects of the present disclosure. In some examples, the wireless communications system 200 may implement aspects of the wireless communications system 100. The wireless communications system 200 may include a UE 115-*a* and a base station 105-*a*, which may be examples of a UE 115 and a base station 105, as described with reference to FIG. 1. In some implementations, the UE 115-*a* or the base station 105-*a* may be an example of a transmitting device or a receiving device, as described with reference to FIG. 1.

Some base stations 105 and some UEs 115 may support single carrier modulation signaling. The some UEs 115 may apply a relatively high power backoff value to signaling using a single carrier waveform to avoid operating in a non-linear region of a power amplifier. However, the relatively high power backoff value may limit the maximal and average transmission power of the signaling and coverage and data rate.

The wireless communications system 200 may support techniques for a transmitting device to operate with a transmission power in a non-linear region of a power amplifier characteristic curves. In some examples, the techniques described herein may be used for uplink signaling. For example, the UE 115-*a* may support operating in the non-linear region by reporting, to the base station 105-*a*, an indication of a UE capability to transmit with a transmission power in a non-linear region of a power amplifier. The UE 115-*a* may transmit, to the base station 105-*a*, signaling (for example, the signaling 210) with the single carrier waveform with a transmission power in the non-linear region based on reporting the UE capability.

For example, the UE 115-*a* may transmit a capability report 205 to the base station 105-*a*. The capability report 205 may indicate that the UE 115-*a* is capable of transmitting single carrier signaling with a transmission power corresponding to the non-linear region of the power amplifier. In some examples, the capability report 205 may indicate a set of power amplifier characteristics of a power amplifier at the UE 115-*a* and a set of power backoff values associated with a non-linear region of the power amplifier. The indication of the set of power amplifier characteristics and the set of power backoff values may be based on power amplifier operation in the non-linear region of power amplifier characteristic curves, as explained in more detail with reference to FIG. 3A. In some examples, the UE 115-*a* may transmit the capability report 205 based on the power amplifier at the UE 115-*a* being memoryless or near memoryless.

In some examples, the capability report 205 may include backoff values for different modulation configurations of the UE 115-*a*. For example, the UE 115-*a* may select different power backoff values for different modulation configurations of the set of modulation configurations in order to operate in the non-linear region. The UE 115-*a* may select the different power backoff values to avoid (for example, refrains from entering) a deep saturation region of the power amplifier, as explained in more detail with reference to FIG. 3A. For example, the UE 115-*a* may select the power backoff values to prevent a set of outer rings (symbols) of a constellation from entering the deep saturation region of the power amplifier. In some examples, the UE 115-*a* may select the power backoff values to approach the deep saturation region while staying within the non-linear region in order to increase maximal transmission power of the signaling 210. The UE 115-*a* may indicate the selected power backoff values avia the capability report 205. In some systems, the set of power backoff values may be selected to avoid the non-linear region and stay within the linear region of the power amplifier characteristic curves. By doing so, the current systems may limit the maximal and average transmission power and efficiency of the power amplifier.

In some implementations, the capability report 205 may indicate constellation types, modulation orders, and MCSs for which the UE 115-*a* supports transmission with a transmission power in the non-linear region of the power amplifier curves. For example, the UE 115-*a* may implement these techniques for a portion of all modulation configurations. Additionally, or alternatively, the modulation configurations enabled for transmission with a transmission power in the non-linear region of the power amplifier curve may be preconfigured or predefined, or the base station 105-*a* may transmit control signaling to configure the UE 115-*a* with a list of modulation configurations which support transmission with a transmission power in the non-linear region of the power amplifier.

Additionally, or alternatively, the capability report 205 may include debiasing factors. For example, the UE 115-*a* may calculate debiasing factors based on the set of power amplifier characteristics and the set of power backoff values. The UE 115-*a* may transmit the capability report 205 including the debiasing factors to the base station 105-*a*. The base station 105-*a* may utilize the debiasing factors to perform debiasing and nonlinearity corrections. In some implementations, the UE 115-*a* may indicate debiasing factors for different modulation configurations, such as for one or more modulation orders, MCSs, constellation radius, or constellation types.

In some examples, the capability report 205 may indicate a set of power amplifier characteristics for a relevant range of the power amplifier characteristic curves. For example, the UE 115-*a* may indicate a set of power amplifier characteristics for a portion of the power amplifier characteristics curves based on the set of power backoff values for each modulation configuration or constellation type. In some examples, the portion of the power amplifier characteristics curves may correspond to a portion of the characteristics curves in which the UE 115-*a* is operating based on the selected power backoff values. This may reduce overhead for the capability report 205. For example the UE 115-*a* may refrain from indicating characteristics for the entire power amplifier characteristics curves, as the UE 115-*a* may not operate in all portions of the power amplifier characteristics curves. The base station 105-*a* may calculate the debiasing factors based on the received capability report 205 and utilize the debiasing factors to perform the debiasing and the nonlinearity corrections.

In some implementations, the UE 115-*a* may report a set of power amplifier characteristics and a set of power backoff values for different antenna configurations of the UE 115-*a*. For example, a capability report 205 may include the set of power amplifier characteristics and the set of power backoff values for the set of modulation configurations per antenna panel, antenna port, power amplifier, polarization, or any combination thereof, of the UE 115-*a*. In some examples, the UE 115-*a* may transmit multiple capability reports 205, each capability report 205 indicating a set of power amplifier characteristics and a set of power backoff values for an antenna configuration used to transmit the capability report 205. For example, a first capability report 205 may include the set of power amplifier characteristics and the set of power backoff values for a first antenna panel, and a second capability report 205 may include the set of power amplifier characteristics and the set of power backoff values for a second antenna panel. For example, the UE 115-*a* may send a dedicated capability report for each antenna panel, antenna port, power amplifier, or polarization, or any combination thereof.

In some examples, the UE 115-*a* may transmit the capability report 205 via control signaling. For example, the UE 115-*a* may transmit the capability report via Layer 1 signaling, such as uplink control information. In some examples, the base station 105-*a* may schedule or request the UE 115-*a* to report the capability report 205. The base station 105-*a* may request for the UE 115-*a* to report the capability report once, periodically, aperiodically, semi-persistently, or after an event, such as a handover procedure. In some examples, the control signaling may include higher layer signaling (for example, higher than Layer 1). For example, the UE 115-*a* may transmit the capability report 205 via RRC signaling, such as UE assistance info (UAI) RRC signaling or a MAC-CE.

In some examples, the UE 115-*a* may infrequently transmit the capability report 205. For example, once the base station 105-*a* determines the debiasing factors to perform the debiasing, the debiasing factors may remain generally static and may be used until the base station 105-*a* or the UE 115-*a* detects a change to the curves, values, or signaling. As such, the UE 115-*a* may report the capability report 205 at a low rate (for example, once or periodically with a long periodicity). By having the UE 115-*a* report the capability report 205 at the low rate, the capability report 205 may be compressed for reporting with a minimal compression loss.

In some implementations, the base station 105-*a* may transmit, to the UE 115-*a*, an enabling message 220 to enable the UE 115-*a* to operate in the non-linear region. For example, the base station 105-*a* may determine that the UE 115-*a* is capable of operating in the non-linear region based on the capability report 205. The base station 105-*a* may transmit, to the UE 115-*a*, the enabling message 220 to dynamically enable, disable, or re-enable the UE 115-*a* to operate in the non-linear region. In some examples, the enabling message 220 may be included in a downlink control information (DCI) message, a MAC-CE message, or an RRC message (for example, in a semi-static scenario).

In some implementations, the base station 105-*a* may transmit the enabling message 220 based on conditions of the UE 115-*a* or types of signaling. For example, the base station 105-*a* may transmit the enabling message 220 based on a physical location of the UE 115-*a*, a precoding and a rank of transmission of the UE 115-*a*, a power sensitivity of the UE 115-*a* (for example, based on a current battery level of the UE 115-*a*), or any combination thereof. In some examples, the base station 105-*a* may enable the UE 115-*a* to operate in the non-linear region of the power amplifier curves for certain situations or configurations, such as up to an indicated MCS or modulation order, or other considerations by the base station 105-*a*. In some examples, the base station 105-*a* may disable the non-linear transmission mode at the UE 115-*a* for some transmission ranks or precoding configurations, such as in examples in which different power amplifiers have different characteristics and are transmitted (for example, mixed) together via precoding.

In some examples, the base station 105-*a* may observe a discrepancy or a mismatch in the reported set of power amplifier characteristics. For example, the base station 105-*a* may detect a mismatch in the reported AM/AM and AM/PM characteristic curves. In some examples, the mismatch may occur due to temperature-related effects at the UE 115-*a* that cause the reported set of power amplifier characteristics to become invalid or outdated. For example, the power amplifier temperature of the UE 115-*a* may vary in time (for example, the UE 115-*a* may heat up after a prolonged use or the UE 115-*a* may cool down while in a low temperature region, among other examples). The set of power amplifier characteristics may vary in accordance with the power amplifier temperature and cause the actual set of power amplifier characteristics to be different than the set of reported power amplifier characteristics.

In some examples, to account for the variance in the power amplifier temperature, the UE 115-*a* may report, to the base station 105-*a*, a set of power amplifier characteristics for several temperature ranges. For example, the UE 115-*a* may include an indication of the set of power amplifier characteristics for the temperature ranges in the capability report 205. In some examples, the UE 115-*a* may report, to the base station 105-*a*, an indication of a temperature of the UE 115-*a* (for example, in addition to, or as an alternative to, an indicator of overheating), which may assist the base station 105-*a* in identifying which power amplifier characteristics to use. In some examples, the UE 115-*a* may indicate that the temperature is within one of a set of temperature ranges. In some examples, the UE 115-*a* may report a set of power amplifier characteristics for each temperature range of the set of temperature ranges. In some examples, the base station 105-*a* may configure the UE 115-*a* with the set of temperature ranges, or the set of temperatures ranges may be predefined or preconfigured. Additionally, or alternatively, the UE 115-*a* may define the set of temperature ranges and indicate the temperature ranges to the base station 105-*a*.

In some examples, the base station 105-*a* may enable the UE 115-*a* to operate in the non-linear region for certain temperature ranges. For example, the UE 115-*a* may report a set of power amplifier characteristics for one or more typical temperature ranges, excluding extremely hot or cold temperature ranges. In some examples, the UE 115-*a* may be enabled to operate in the non-linear region for the typical temperature ranges, and operation in the non-linear region may be disabled for other temperature regions, or temperature regions outside of the typical temperature range (for example, extremely hot or cold temperatures).

In some implementations, the UE 115-*a* may receive, from the base station 105-*a*, the enabling message 220 and operate in the non-linear region based on the enabling message 220. The UE 115-*a* may amplify the transmission power of the signaling 210 to operate in the non-linear region, modulate the signaling 210 according to a modulation scheme (for example, a QAM, an APSK, or any other modulation scheme), and transmit the signaling 210 to the base station 105-*a*. In order for the base station 105-*a* to recover an original signaling (for example, the signaling 210 before transmission power amplification and modulation) with the single carrier waveform, the base station 105-*a* may perform the debiasing and the nonlinearity corrections on the received signaling 210. To perform the debiasing and nonlinearity corrections, the base station 105-*a* may use the indicated set of power amplifier characteristics, set of power backoff values, debiasing factors, or any combination thereof.

In some implementations, the capability report 205 may include the indication of the UE capability, the indication of the set of power amplifier characteristics and the set of power backoff values, the portion of the power amplifier characteristics, the debiasing factors, the indication of the set of power amplifier characteristics for several temperature ranges, the indication of the temperature of the UE 115-*a*, the indication of being within the temperature range of the set of temperature ranges, or any combination thereof. While the capability report 205 is shown to be a single report in FIG. 2, it is to be understood that the capability report 205 may consist of multiple reports in accordance with the indications listed.

The techniques described herein may also be used for downlink signaling. For example, the UE 115-a may support reception of signaling in the non-linear region. In some examples, the UE 115-a may transmit the capability report 205 indicating a UE capability to receive a single carrier waveform transmitted using a transmission power in a non-linear region of power amplifier characteristic curves. Based on the capability of the UE 115-a, the base station 105-a may indicate a set of power amplifier characteristics and a set of power backoff values associated with a power amplifier at the base station 105-a. The base station 105-a may then transmit signaling using a single carrier waveform (for example, signaling 225) in the non-linear region of the power amplifier.

For downlink techniques, the capability report 205 may indicate a capability of the UE 115-a to support reception of the single carrier waveform signaling with the transmission power in the non-linear region of the power amplifier. In some examples, the capability report 205 may indicate a capability of the UE 115-a to perform debiasing and non-linearity corrections (for example, for I/Q samples or constellation symbols, among other examples) using the set of power amplifier characteristics and the set of power backoff values indicated by the base station 105-a.

In some implementations, the configuration message 215 may include the indication of the set of power amplifier characteristics for a power amplifier at the base station 105-a and a set of power backoff values that are based on operation of the power amplifier in the non-linear region. The base station 105-a may transmit the configuration message 215 to the UE 115-a to configure the UE 115-a for reception of the signaling 225 in the non-linear region. The UE 115-a may utilize the indicated set of power amplifier characteristics and the set of power backoff values to calculate debiasing factors to perform the debiasing and nonlinearity corrections.

Additionally, or alternatively, the base station 105-a may indicate debiasing factors to the UE 115-a. For example, the base station 105-a may calculate the debiasing factors based on the set of power amplifier characteristics and the set of power backoff values per modulation configuration (for example, a constellation radius, a constellation type, a modulation order, an MCS). The base station 105-a may transmit the configuration message 215 including the debiasing factors to the UE 115-a. The UE 115-a may utilize the debiasing factors to perform the debiasing and the nonlinearity corrections.

Once the UE 115-a has the debiasing factors to perform the debiasing, the debiasing factors may be utilized for a relatively long time. As such, the base station 105-a may transmit the configuration message 215 at a low rate (for example, once, or once per the relatively long time). By having the base station 105-a transmit the configuration message 215 at the low rate, the configuration message 215 may be compressed for transmitting with a minimal compression loss (for example, to address some aging effect).

In some examples, the set of power backoff values may be associated with a set of modulation configurations (for example, constellation types, modulation orders, or MCSs). For example, the base station 105-a may select different power backoff values for different modulation configuration to operate in the non-linear region. The base station 105-a may select the different power backoff values to avoid a deep saturation region of the power amplifier, as explained in more detail with reference to FIG. 3A. In some examples, the base station 105-a may select the different power backoff values to approach the deep saturation region, while staying within the non-linear region, in order to increase maximal transmission power of the signaling 225. The base station 105-a may transmit, to the UE 115-a, the selected power backoff values as the set of power backoff values included in the configuration message 215.

In some implementations, the base station 105-a may configure power amplifier characteristics and power backoff values per antenna panel, per antenna port, per power amplifier, per polarization, or per any combination thereof, of the base station 105-a. For example, the configuration message 215 may include multiple sets of power amplifier characteristics and power backoff values. The multiple sets may include a first set of power amplifier characteristics and a first set of power backoff values for a first antenna panel, a second set for a second antenna panel, and so on. The list may include sets for all or a portion of each antenna panel, antenna port, power amplifier, polarization, or any combination thereof, of the base station 105-a. Additionally or alternatively, the base station 105-a may transmit multiple configuration messages 215, such that each configuration message of the multiple configuration messages 215 is associated with the antenna panel, the antenna port, the power amplifier, the polarization, or any combination thereof, of the base station 105-a.

In some implementations, the base station 105-a may transmit, to the UE 115-a, an enabling message 220 to indicate operation in the non-linear region. For example, the base station 105-a may determine that the UE 115-a is capable of receiving the signaling 225 with the transmission power in the non-linear region. Based on the determination, the base station 105-a may transmit, to the UE 115-a, the enabling message 220 to dynamically enable, disable, or re-enable the UE 115-a to receive signaling which is transmitted by the base station 105-a using a transmission power in the non-linear region. In some examples, the enabling message 220 may be included in a DCI message or a MAC-CE message. Additionally or alternatively, the enabling message 220 may be included in an RRC message (for example, in a semi-static scenario). In some examples, the RRC message may include a definition for applicability (for example, to operate in the non-linear region for rank one signaling, for MCS within a specified range, among other examples).

In some examples, the set of power amplifier characteristics may change due to a fluctuation of a power amplifier temperature of the base station 105-a. For example, the power amplifier temperature of the base station 105-a may vary in time (for example, the base station 105-a may heat up after a prolonged use or the base station 105-a may cool down while in a low temperature region, among other examples). As the power amplifier temperature varies, the set of power amplifier characteristics may also vary in accordance with the power amplifier temperature.

In some examples, to account for the variance in the power amplifier temperature, the base station 105-a may transmit, to the UE 115-a, a set of power amplifier characteristics for several temperature ranges. For example, the base station 105-a may include an indication of the set of power amplifier characteristics for the temperature ranges in the configuration message 215. In some examples, the base station 105-a may transmit, to the UE 115-a, an indication of a temperature of the base station 105-a, which may assist the UE 115-a in identifying which power amplifier characteristics to use. In some examples, the base station 105-a may indicate that the temperature is within one of a set of temperature ranges. In some examples, the base station 105-a may indicate a set of power amplifier characteristics for each temperature range of the set of temperature ranges.

In some examples, the base station 105-a may transmit, to the UE 115-a, the configuration message 215 including an indication of which of the set of power amplifier characteristics, the set of power backoff values, or both, to use. The indication may be included in a DCI message or a MAC-CE message to dynamically indicate to the UE 115-a which of the set of power amplifier characteristics, the set of power backoff values, or both, to use based on the power amplifier temperature.

In some implementations, the configuration message 215 may include the indication of the set of power amplifier characteristics and the set of power backoff values; the portion of the power amplifier characteristics; the debiasing factors; the indication of the set of power amplifier characteristics for several temperature ranges; the indication of the temperature of the base station 105-a; the indication of being within the temperature range of the set of temperature ranges; the indication of which of the set of power amplifier characteristics, the set of power backoff values, or both, to use; or any combination thereof. While the configuration message 215 is indicated to be a single message in FIG. 2, it is to be understood that the configuration message 215 may consist of multiple messages in accordance with the indications listed. In some examples, the configuration message 215 may be included in a DCI message, a MAC-CE message, or an RRC message.

Figure 3A:
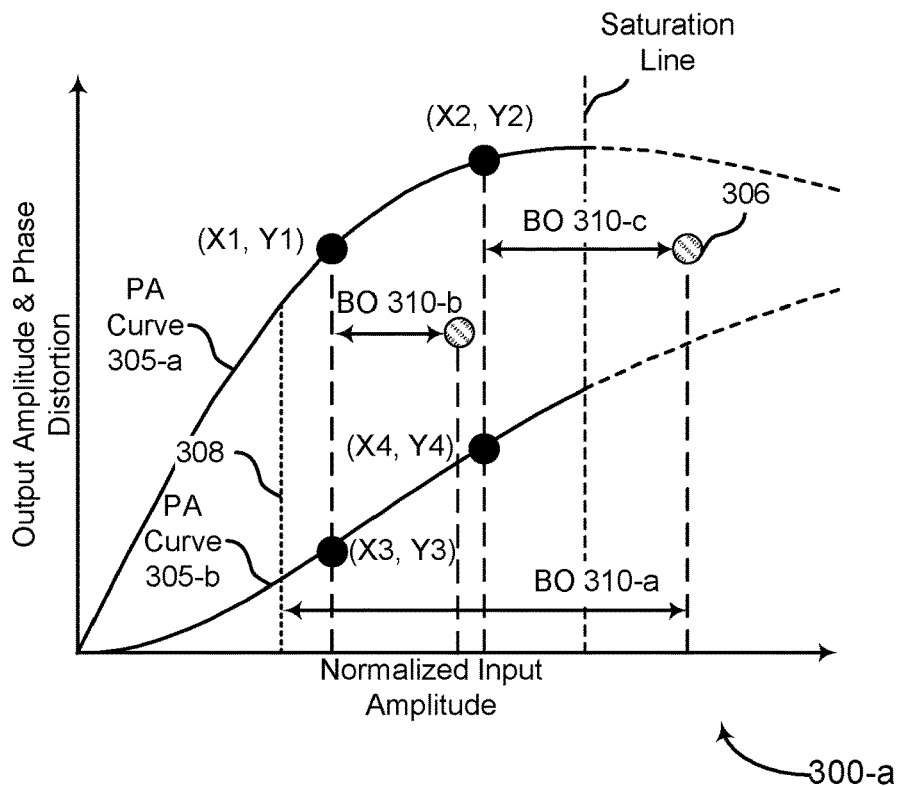
FIG. 3A illustrates an example of a plot that supports power characteristics reporting for signaling using single carrier modulation in accordance with aspects of the present disclosure.
Figure 3B:
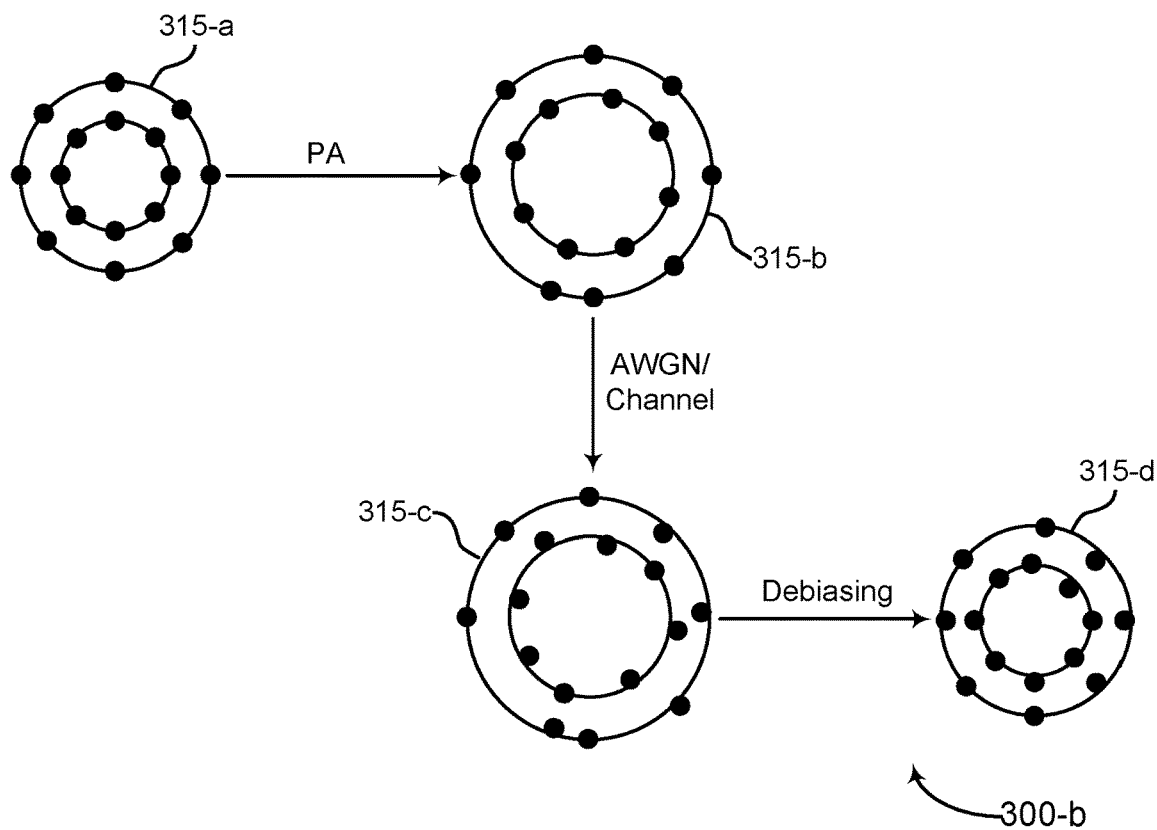
FIG. 3B illustrates an example of a process that supports power characteristics reporting for signaling using single carrier modulation in accordance with aspects of the present disclosure.

FIGS. 3A and 3B illustrate examples of a plot 300-a and a process 300-b respectively, that support power characteristics reporting for signaling using single carrier modulation in accordance with aspects of the present disclosure. In some examples, the plot 300-a and the process 300-b may implement or be implemented by aspects of the wireless communications system 100 and the wireless communications system 200, as described in in FIGS. 1 and 2. For example, one or both of the plot 300-a and the process 300-b may be implemented by one or both of a base station 105 or a UE 115 to support techniques for power characteristics reporting for signaling using single carrier modulation.

In the example of FIG. 3A, a power amplifier curve 305-a and a power amplifier curve 305-b may represent different characteristic curves. For example, the power amplifier curve 305-a may represent an AM/AM characteristic curve and the power amplifier curve 305-b may represent an AM/PM characteristic curve. The power amplifier curves 305-a and 305-b may be divided into three separate regions, a linear region, a non-linear region, and a saturation region. In some examples, a wireless device operating in the saturation region may cause undecodable transmissions due to a lack of one to one mapping of points along the power amplifier curves 305-a and 305-b. In some cases, operating in the non-linear region may lead to lower signal quality (for example, due to EVM deterioration caused by intra-band and inter-band emissions).

In some examples, some base stations 105 and some UEs 115 may support single carrier modulation signaling. For some implementations of single carrier modulation signaling, UEs 115 may apply a relatively high power backoff value (for example, a power backoff value 310-a) to signaling using a single carrier waveform to avoid operating in the saturation region and the non-linear region of a power amplifier. For example, the some UEs 115 may have an initial transmission power in the saturation region of the power amplifier. The UEs 115 may apply the power backoff value 310-a (for example, −9.5 decibel (dB)) to the initial transmission power to move (reduce) the initial transmission power to line 308, ensuring operation in the linear region. However, the power backoff value 310-a may limit the maximal and average transmission power of the signaling and coverage and data rate.

The techniques described herein may support a transmitting device (for example, a UE 115 or a base station 105) to operate with a transmission power in the non-linear region of the power amplifier curves 305-a and 305-b. For example, the transmitting device may support operating in the non-linear region by transmitting a message, to a receiving device (for example, a UE 115 or a base station 105), indicating characteristics of the power amplifier curves 305-a and 305-b and a set of power backoff values (for example, a power backoff value 310-b and a power backoff value 310-c). The transmitting device may then transmit signaling to the receiving device using a single carrier waveform with a transmission power in the non-linear region of the power amplifier curves 305-a and 305-b. The receiving device may perform debiasing and nonlinearity corrections on the received signaling based on the power amplifier curves 305-a and 305-b and the set of power backoff values, as described in more detail with reference to FIG. 3B.

In some examples, the transmitting device may have an initial transmission power at point 306. In this example, the initial transmission power at point 306 may represent a constellation that includes a first radius of 1.2 radians along a normalized input amplitude line, and a second radius of 0.75 radians along an output amplitude and phase distortion line, such that an average constellation power is 1. The transmitting device may apply the power backoff value 310-c (for example, −3.5 dB) to the initial transmission power at point 306 to move (reduce) the initial transmission power to intersect the power amplifier curves 305-a and 305-b at coordinates (X2, Y2) and (X4, Y4) respectively. Similarly, the transmitting device may apply the power backoff value 310-b (for example, −3.5 dB) to a transmission power to intersect the power amplifier curves 305-a and 305-b at coordinates (X1, Y1) and (X3, Y3) respectively. By applying the power backoff values 310-c and 310-b, the transmitting device may avoid operating in the saturation region of the power amplifier and instead operate in the non-linear region.

In this example, by applying the power backoff values 310-c and 310-b rather than the power backoff value 310-a, a transmission power of the transmitting device may be improved by approximately 4.3 dB. This example is meant to be illustrative of the possible benefits of the described techniques, and are not to be construed as limiting to only this specific implementation. Different constellations and modulation configurations may lead to different exact values, but still yield a significant transmission power improvement.

In the example of FIG. 3B, a constellation 315-a, a constellation 315-b, a constellation 315-c, and a constellation 315-d may represent the transmitting device transmitting the signaling with the single carrier waveform over a channel, and the receiving device receiving the signaling and debiasing the received signaling. In some examples, the constellations 315-a, 315-b, 315-c, and 315-d may represent effects of the power amplifier on single carrier-APSK modulation in the constellation domain in examples including operating in the non-linear region. Different constellation rings of the constellations 315-a, 315-b, 315-c, and 315-d may represent different amplitudes and phase deviations (per constellation radius). Because the example of FIG. 3B is indicative of a single carrier waveform, each constellation point or modulated signal is transmitted separately in time. For an OFDM waveform, each constellation point or modulated signal may not be transmitted separately in time. The example of FIG. 3B is indicative of the same example used for FIG. 3A. While the examples are represented according to APSK modulation, other types of modulation (for example, QAM) are also applicable to the techniques described herein.

The techniques described herein may support the transmitting device to operate with a transmission power in the non-linear region of power amplifier curves, as described in more detail with respect to FIG. 3A. For example, the transmitting device may prepare signaling using a single carrier waveform for transmission by using a power amplifier of the transmitting device to amplify a transmission power of the signaling. The signaling is first represented by the constellation 315-a. The constellation 315-a includes constellation points representative of data carried by the constellation 315-a. After the power amplification is applied the signaling becomes the constellation 315-b, in which a first radius of an inner constellation ring and a second radius of an outer constellation ring are increased to a third radius of the inner constellation ring and a fourth radius of the outer constellation ring. Due to the power amplification, noise may be introduced to the constellation points of the signaling, such that the points are not aligned on the constellation rings. The transmitting device may transmit the power amplified signaling over a channel. In some examples, the channel may be an additive white gaussian noise (AWGN) channel, or other channel types, where the effect on EVM due to signal debiasing may be considered.

In some examples, the receiving device may receive the power amplified signaling over the channel. The received signaling is represented by the constellation 315-c. The constellation 315-c may maintain the same radius (for example, the third radius and the fourth radius) of the constellation rings as the power amplified signaling, with more noise added to the constellation points. The receiving device may perform debiasing and nonlinearity corrections on the received signaling. In order to perform the debiasing and nonlinearity corrections, the receiving device may use power amplifier curves and a set of power backoff values received from the transmitting device. The debiased signaling is represented by the constellation 315-d. The constellation 315-d has a same radius of the constellation rings as the original signaling (for example, the first radius and the second radius). Because the receiving device has the power amplifier curves and the set of power backoff values associated with the original signaling, the receiving device may reduce the amount of noise introduced to the original signaling and produce a similar (for example, with little to no noise) constellation with similar constellation points as the original signaling. Thus, allowing the transmitting device to operate in the non-linear region utilizing higher transmission power.

Figure 4:
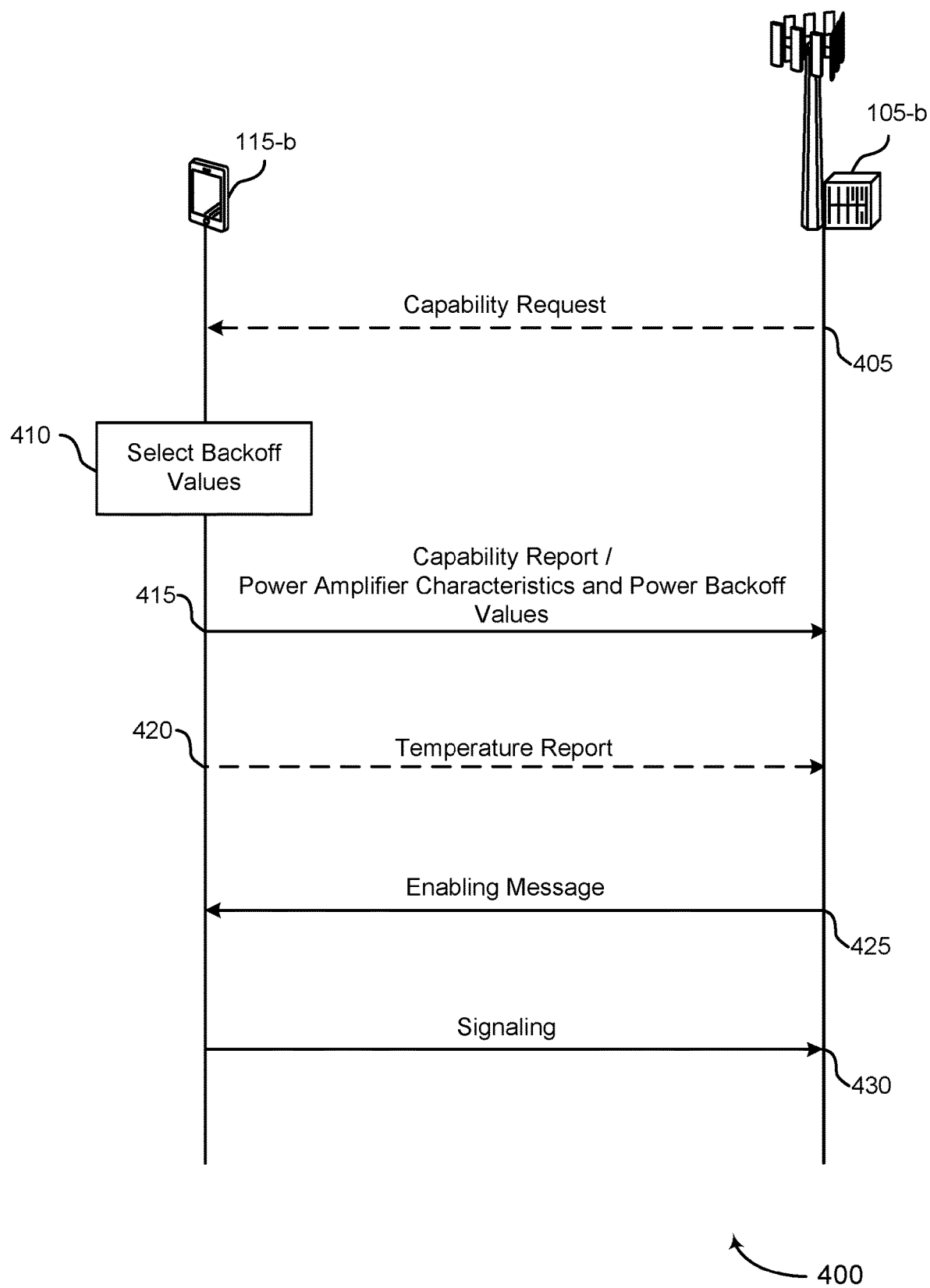
FIG. 4 and FIG. 5 illustrate examples of process flows that support power characteristics reporting for signaling using single carrier modulation in accordance with aspects of the present disclosure.

FIG. 4 illustrates an example of a process flow 400 that supports power characteristics reporting for signaling using single carrier modulation in accordance with aspects of the present disclosure. The process flow 400 may be related to operations performed by a UE 115-b and a base station 105-b, which may be respective examples of a UE 115 and a base station 105 as described with reference to FIGS. 1-3. In some examples, the UE 115-b may be an example of a transmitting device and the base station 105-b may be an example of a receiving device. The techniques described herein may an example of uplink signaling in a non-linear region of a power amplifier.

In some examples, at 405, the base station 105-b may transmit a capability request to the UE 115-b. For example, the UE 115-b may receive a request from the base station 105-a to transmit a message indicating a set of power amplifier characteristics and a set of power backoff values. The capability request may include a request for the UE 115-b to indicate whether the UE 115-b is capable of operating in a non-linear region of a power amplifier of the UE 115-b. In some examples, operating in the non-linear region may include applying a set of power backoff values to a transmission power of signaling that is to be transmitted to the base station 105-b. By applying the set of power backoff values, the transmission power may be moved to the non-linear region of power amplifier characteristics curves.

At 410, the UE 115-b may select the set of power backoff values according to the power amplifier characteristics curves. In some examples, the UE 115-b may select different power backoff values for different MCSs, constellation types, modulation orders, or any combination thereof. The UE 115-b may select the different power backoff values to avoid operating in a saturation region and maintain operation in the non-linear region of the power amplifier. For example, the UE 115-b may select the power backoff values to approach the saturation region in order to increase the transmission power of the signaling.

At 415, the UE 115-b may transmit a message to the base station 105-b. In some implementations, the message may include a capability report. In some implementations, the capability report may be in response to the received capability request. The capability report may indicate that the UE 115-b supports single carrier modulation and is capable of transmitting in the non-linear region of the power amplifier. Additionally or alternatively, the capability report may indicate that the UE 115-b supports the ability to transmit the set of power backoff values and a set of power amplifier characteristics (for example, the set of power amplifier characteristics may be characteristics of the power amplifier characteristics curves).

In some examples, the message may indicate the set of power amplifier characteristics and the set of power backoff values for one or more modulation configurations of the UE 115-a, the set of power backoff values being associated with a non-linear region of a power amplifier characteristic curve of the UE 115-a. In some implementations, the set of power amplifier characteristics may include a portion of a relevant range of the power amplifier characteristics curves based on the set of power backoff values. The portion may correspond to a portion of the power amplifier characteristics curves where the UE 115-b is operating.

In some implementations, the indication of the set of power amplifier characteristics and the set of power backoff values may be for each antenna port, each antenna panel, each power amplifier, each polarization, or any combination thereof, of the UE 115-b. In some implementations, the indication of the set of power amplifier characteristics and the set of power backoff values may be for one or more modulation constellation types, one or more modulation orders, one or more MCS, or any combination thereof. In some implementations, the indication of the set of power amplifier characteristics and the set of power backoff values may be for each of a set of temperature ranges of the power amplifier.

Additionally or alternatively, the indication may include an indication of a set of debiasing factors. For example, the message may include an indication of a debiasing factor for each of the one or more modulation configurations, such as for each constellation radius, each modulation constellation type, each modulation constellation order, each MCS, or any combination thereof.

In some implementations, the capability report, the indication of the set of power amplifier characteristics and the set of power backoff values, the indication of the portion of the relevant range of the power amplifier characteristics curves, the indication per antenna panel, power amplifier, polarization, modulation constellation type, modulation order, MCS, or any combination thereof, the indication per temperature range, the indication of the set of debiasing factors, or any combination thereof; may be sent in separate messages. The separate messages, the message, or both, may be a part of a DCI message, a MAC-CE message, an RRC message, or any combination thereof.

In some implementations, at 420, the UE 115-*b* may transmit, to the base station 105-*b*, a temperature report. The temperature report may indicate a temperature (for example, a current temperature or a future temperature) of the power amplifier of the UE 115-*b*. The temperature report may enable the base station 105-*b* to determine which of the indicated set of power amplifier characteristics and the indicated set of power backoff values is associated with the temperature of the power amplifier based on the indicated set of temperature ranges.

In some implementations, the base station 105-*b* may transmit, to the UE 115-*b*, an enabling message at 425. In some examples, the enabling message may indicate whether the UE 115-*b* is enabled or disabled to transmit the signaling with the transmission power in the non-linear region of the power amplifier. In some examples, the enabling message may be a part of a DCI message, a MAC-CE message, an RRC message, or any combination thereof. In some examples, the UE 115-*b* may receive the enabling message based on a transmission rank, a precoding, a geolocation of the UE 115-*b*, an indicated error for the set of power amplifier characteristics and the set of power backoff values, a power sensitivity or battery level of the UE 115-*b*, or any combination thereof.

At 430, the UE 115-*b* may transmit, to the base station 105-*b*, the signaling using a single carrier waveform at the transmission power in the non-linear region of the power amplifier. The base station 105-*b* may utilize the received message, the received separate messages, or both, to perform debiasing on the received signaling. The base station 105-*b* may debias the received signaling and determine a similar (for example, with little to no noise) signaling to the original signaling that the UE 115-*b* transmitted.

Figure 5:
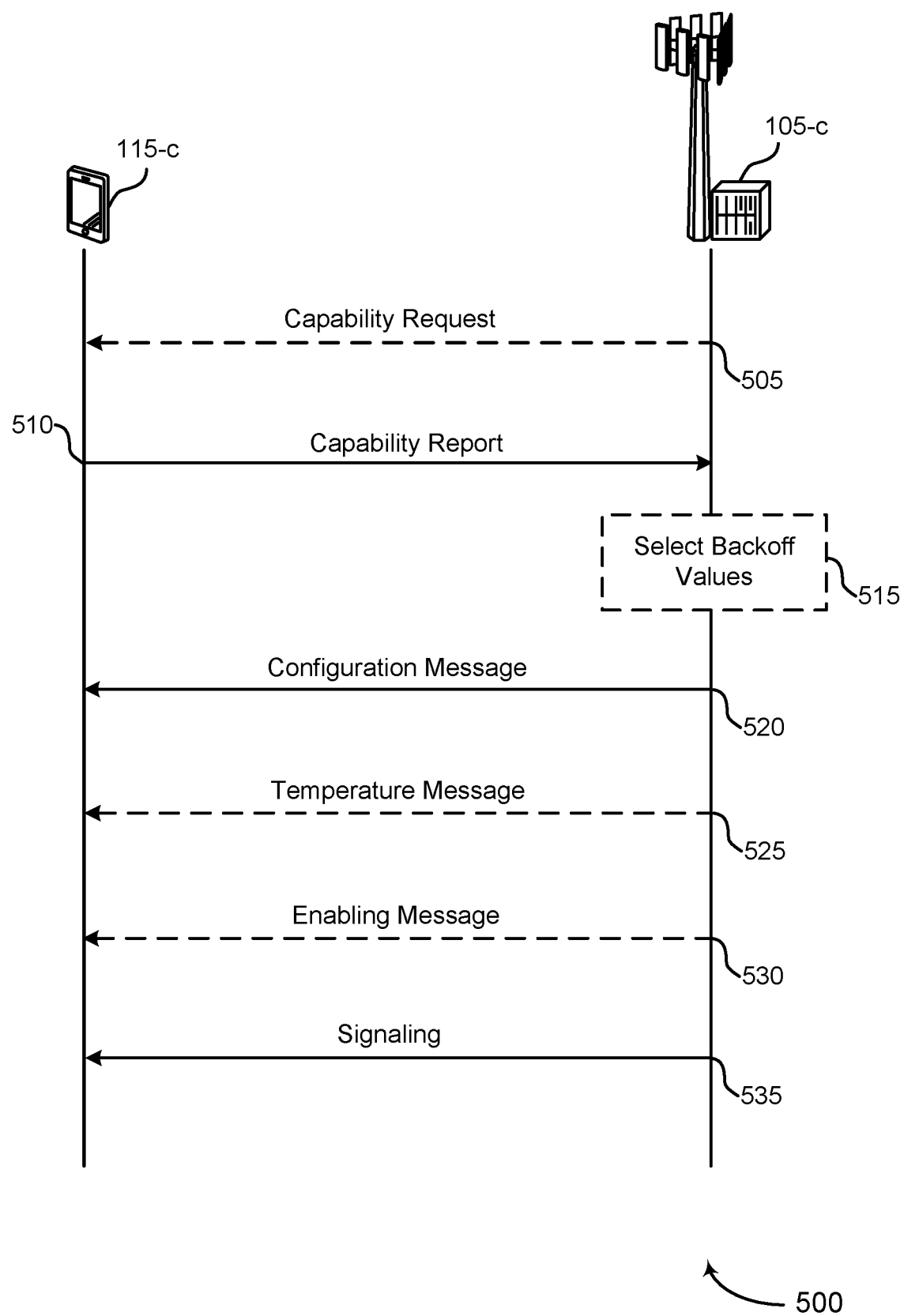

FIG. 5 illustrates an example of a process flow 500 that supports power characteristics reporting for signaling using single carrier modulation in accordance with aspects of the present disclosure. The process flow 500 may be related to operations performed by a UE 115-*c* and a base station 105-*c*, which may be respective examples of a UE 115 and a base station 105 as described with reference to FIGS. 1-4. In some examples, the UE 115-*c* may be an example of a receiving device and the base station 105-*c* may be an example of a transmitting device. The techniques described herein may be used for downlink signaling.

In some implementations, the base station 105-*c* may transmit a capability request to the UE 115-*c* at 505. The capability request may include a request for the UE 115-*c* to indicate whether the UE 115-*c* is capable of receiving signaling (for example, signaling using a single carrier waveform) with a transmission power in a non-linear region of a power amplifier of the base station 105-*c*. In some examples, to the capability may be based on a capability of the UE 115-*c* to perform debiasing and nonlinearity corrections on the received signaling based on power amplifier characteristic curves and power backoff values.

At 510, the UE 115-*c* may transmit, to the base station 105-*c*, a message indicating whether the UE 115-*c* is capable of receiving the signaling with transmission power in the non-linear region of a power amplifier. In some examples, the message may indicate that the UE 115-*c* is capable of receiving the signaling and able to perform the debiasing and the nonlinearity corrections on the received signaling.

In some implementations, the base station 105-*c* may select a set of power backoff values at 515. The base station 105-*c* may select the power backoff values to be used for operating in the non-linear region of the power amplifier. In some examples, operating in the non-linear region may include applying the set of power backoff values to the transmission power of the signaling that is to be transmitted to the UE 115-*c*. By applying the set of power backoff values, the transmission power may be moved to the non-linear region of the power amplifier characteristics curves. In some examples, the base station 105-*c* may select different backoff values for different MCSs, constellation types, modulation orders, or any combination thereof. The base station 105-*c* may select the different backoff values to avoid operating in a saturation region and maintain operation in the non-linear region of the power amplifier. For example, the base station 105-*c* may select the different backoff values to approach the saturation region in order to increase the transmission power of the signaling.

At 520, the base station 105-*c* may transmit, to the UE 115-*c*, a configuration message in response to the received capability report. The configuration message may indicate the set of power amplifier characteristics and the set of power backoff values.

In some implementations, the base station 105-*c* may indicate the set of power amplifier characteristics and the set of power backoff values for one or more antenna ports, one or more antenna panels, one or more power amplifiers, one or more polarizations, or any combination thereof, of the base station 105-*c*. In some implementations, the indication of the set of power amplifier characteristics and the set of power backoff values may be for one or more modulation constellation types, one or more modulation orders, one or more MCS, or any combination thereof. In some implementations, the indication of the set of power amplifier characteristics and the set of power backoff values may be for each of a set of temperature ranges of the power amplifier.

Additionally or alternatively, the indication may include an indication of a set of debiasing factors for each constellation radius, each modulation constellation type, each modulation constellation order, each MCS, or any combination thereof.

In some implementations, the capability report, the indication of the set of power amplifier characteristics and the set of power backoff values, the indication per antenna panel, power amplifier, polarization, modulation constellation type, modulation order, MCS, or any combination thereof, the indication per temperature range; the indication of the set of debiasing factors, or any combination thereof, may be sent in separate messages. The separate messages, the message, or both, may be a part of a DCI message, a MAC-CE message, an RRC message, or any combination thereof.

In some implementations, at 525, the base station 105-*c* may transmit a temperature message to the UE 115-*c*. The temperature message may indicate a temperature (for example, a current temperature or a future temperature) of the power amplifier of the base station 105-*c*. The temperature report may allow the UE 115-*c* to determine which of the indicated set of power amplifier characteristics and the indicated set of power backoff values is associated with the temperature of the power amplifier based on the indicated set of temperature ranges.

In some implementations, at 530, the base station 105-*c* may transmit an enabling message to the UE 115-*c*. In some examples, the enabling message may indicate whether the UE 115-*c* is enabled or disabled to receive the signaling with the transmission power in the non-linear region of the power amplifier. In some examples, the enabling message may be a part of a DCI message, a MAC-CE message, an RRC message, or any combination thereof. In some examples, the enabling message may indicate definitions for applicability. For example, the UE 115-*c* may be enabled to receive the signaling based on a transmission rank (for example, equal to one) or an MCS (for example, in a specified range), among other examples.

At 535, the base station 105-*c* may transmit, to the UE 115-*c*, the signaling using a single carrier waveform at the transmission power in the non-linear region of the power amplifier. The UE 115-*c* may utilize the received message, the received separate messages, or both, to perform the debiasing and the nonlinearity corrections on the received signaling. The UE 115-*c* may debias the received signaling and determine a similar (for example, with little to no noise) signaling to the original signaling that the base station 105-*c* transmitted.

Figure 6:
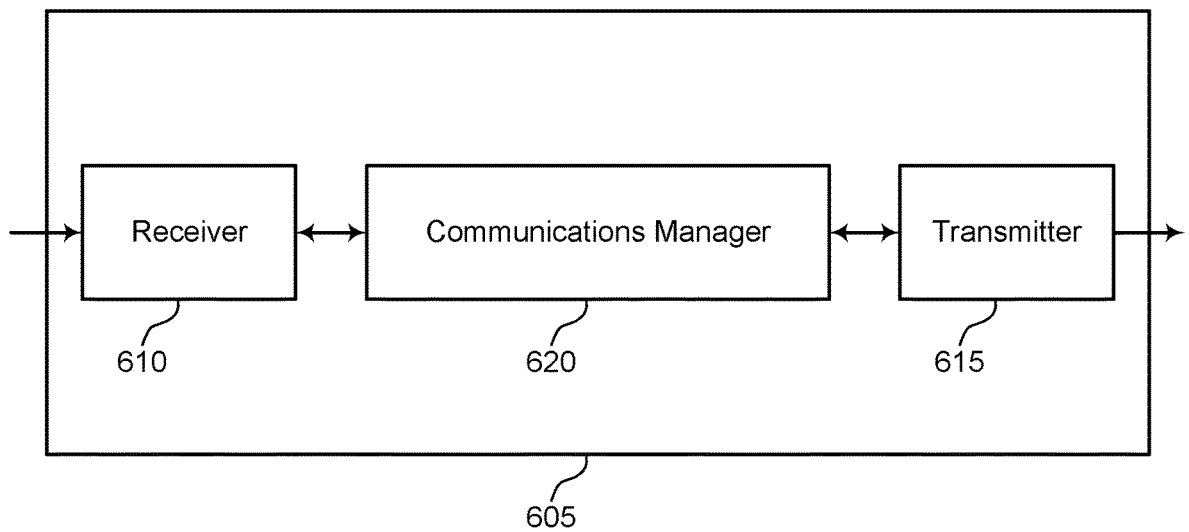
FIGS. 6 and 7 show block diagrams of devices that support power characteristics reporting for signaling using single carrier modulation in accordance with aspects of the present disclosure.

FIG. 6 shows a block diagram of a device 605 that supports power characteristics reporting for signaling using single carrier modulation in accordance with aspects of the present disclosure. The device 605 may be an example of aspects of a UE 115 as described herein. The device 605 may include a receiver 610, a transmitter 615, and a communications manager 620. The communications manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to power characteristics reporting for signaling using single carrier modulation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to power characteristics reporting for signaling using single carrier modulation). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations thereof or various components thereof may be examples of means for performing various aspects of power characteristics reporting for signaling using single carrier modulation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (for example, receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first device in accordance with examples as disclosed herein. For example, the communications manager 620 may be configured as or otherwise support a means for transmitting, to a second device, a message indicating a set of power amplifier characteristics and a set of power backoff values for each of one or more modulation configurations of the first device, the set of power backoff values being associated with a non-linear region of power amplifier characteristic curves of the first device. The communications manager 620 may be configured as or otherwise support a means for transmitting, to the second device, based on transmitting the message indicating the set of power amplifier characteristics and the set of power backoff values, signaling using a single carrier waveform at a transmission power in the non-linear region of the power amplifier characteristic curves based on applying one or more power backoff values of the set of power backoff values.

By including or configuring the communications manager 620 in accordance with examples as described herein, the device 605 (for example, a processor controlling or otherwise coupled to the receiver 610, the transmitter 615, the communications manager 620, or a combination thereof)

may support techniques for increased energy efficiency, improved coverage (for example, rate over range), increased maximal and average transmission power, decreased complexity, and power management, among other advantages.

Figure 7:
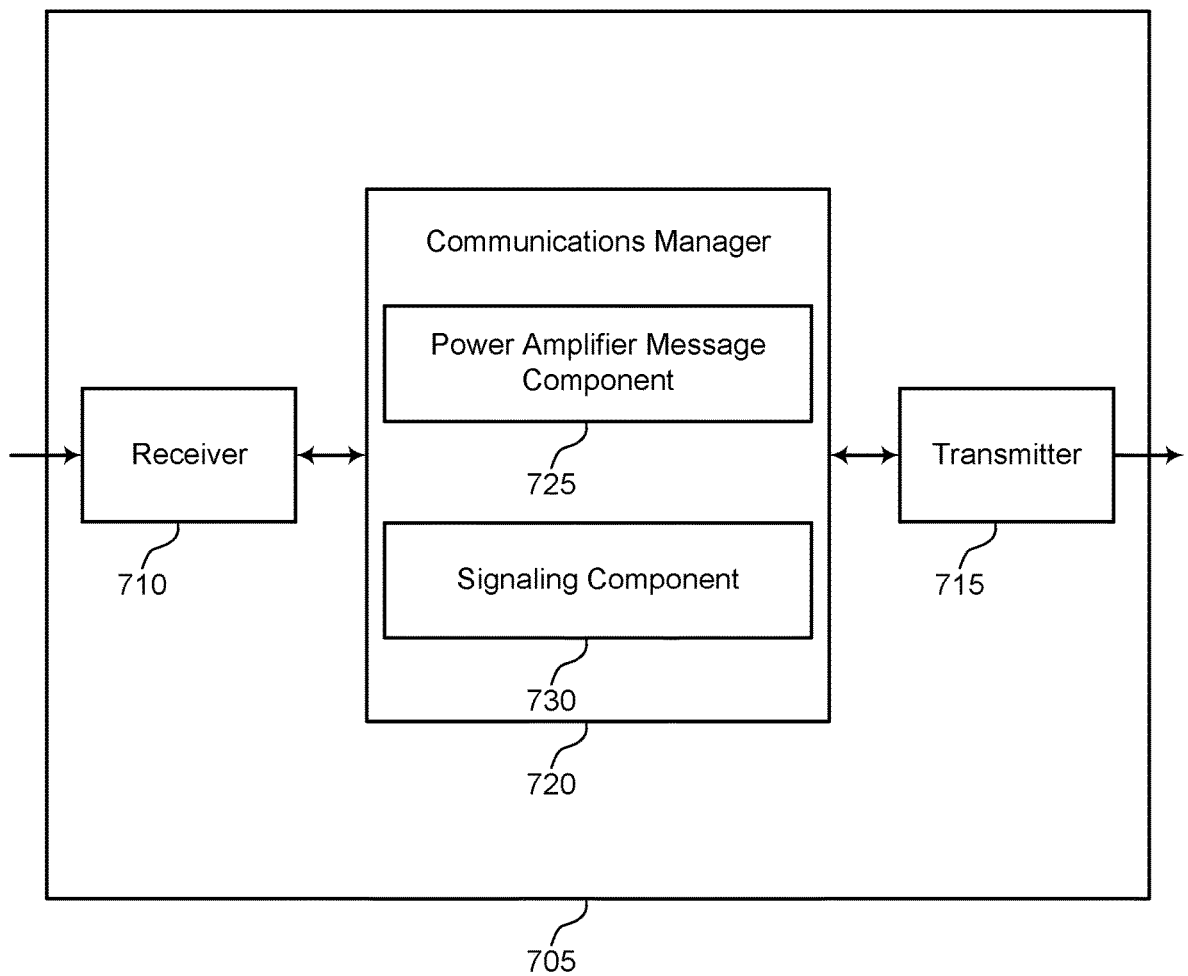

FIG. 7 shows a block diagram of a device 705 that supports power characteristics reporting for signaling using single carrier modulation in accordance with aspects of the present disclosure. The device 705 may be an example of aspects of a device 605 or a UE 115 as described herein. The device 705 may include a receiver 710, a transmitter 715, and a communications manager 720. The communications manager 720 can be implemented, at least in part, by one or both of a modem and a processor. Each of these components may be in communication with one another (for example, via one or more buses).

The receiver 710 may provide a means for receiving information such as packets, user data, control information, or any combination thereof associated with various information channels (for example, control channels, data channels, information channels related to power characteristics reporting for signaling using single carrier modulation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (for example, control channels, data channels, information channels related to power characteristics reporting for signaling using single carrier modulation). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of power characteristics reporting for signaling using single carrier modulation as described herein. For example, the communications manager 720 may include a power amplifier message component 725 a signaling component 730, or any combination thereof. In some examples, the communications manager 720, or various components thereof, may be configured to perform various operations (for example, receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first device in accordance with examples as disclosed herein. The power amplifier message component 725 may be configured as or otherwise support a means for transmitting, to a second device, a message indicating a set of power amplifier characteristics and a set of power backoff values for each of one or more modulation configurations of the first device, the set of power backoff values being associated with a non-linear region of power amplifier characteristic curves of the first device. The signaling component 730 may be configured as or otherwise support a means for transmitting, to the second device, based on transmitting the message indicating the set of power amplifier characteristics and the set of power backoff values, signaling using a single carrier waveform at a transmission power in the non-linear region of the power amplifier characteristic curves based on applying one or more power backoff values of the set of power backoff values.

Figure 8:
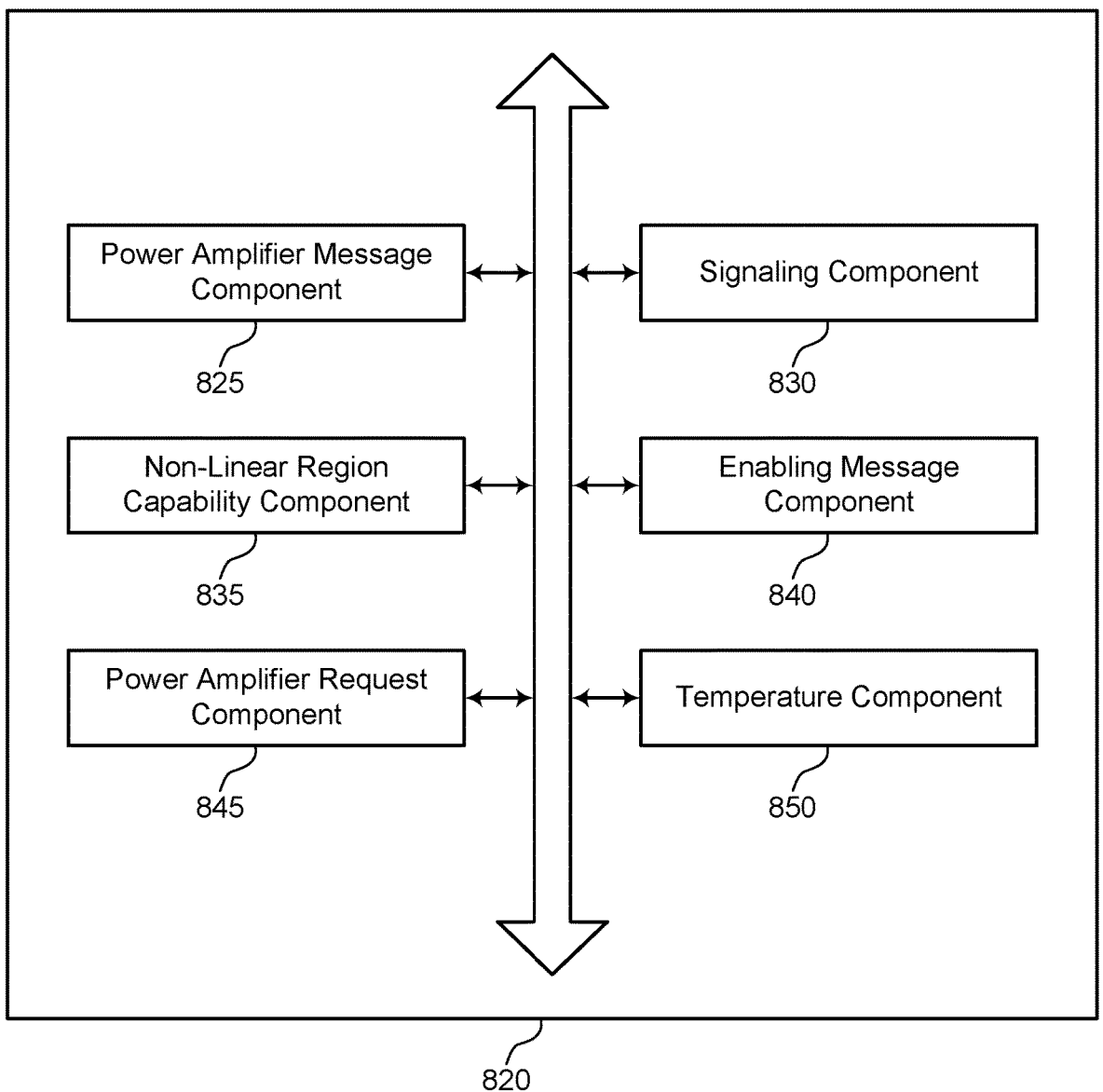
FIG. 8 shows a block diagram of a communications manager that supports power characteristics reporting for signaling using single carrier modulation in accordance with aspects of the present disclosure.

FIG. 8 shows a block diagram of a communications manager 820 that supports power characteristics reporting for signaling using single carrier modulation in accordance with aspects of the present disclosure. The communications manager 820, or various components thereof, may be an example of means for performing various aspects of power characteristics reporting for signaling using single carrier modulation as described herein. For example, the communications manager 820 may include a power amplifier message component 825, a signaling component 830, a non-linear region capability component 835, an enabling message component 840, a power amplifier request component 845, a temperature component 850, or any combination thereof. Each of these components may communicate, directly or indirectly, with one another (for example, via one or more buses).

The communications manager 820 may support wireless communications at a first device in accordance with examples as disclosed herein. The power amplifier message component 825 may be configured as or otherwise support a means for transmitting, to a second device, a message indicating a set of power amplifier characteristics and a set of power backoff values for each of one or more modulation configurations of the first device, the set of power backoff values being associated with a non-linear region of power amplifier characteristic curves of the first device. The signaling component 830 may be configured as or otherwise support a means for transmitting, to the second device, based on transmitting the message indicating the set of power amplifier characteristics and the set of power backoff values, signaling using a single carrier waveform at a transmission power in the non-linear region of the power amplifier characteristic curves based on applying one or more power backoff values of the set of power backoff values.

In some examples, to support message, the power amplifier message component 825 may be configured as or otherwise support a means for an indication of a capability to support transmission with the transmission power in the non-linear region of the power amplifier characteristic curves, where transmitting the signaling is based on having the capability.

In some examples, the non-linear region capability component 835 may be configured as or otherwise support a means for receiving, from the second device, an indication of a capability for the second device to receive signaling with the transmission power in the non-linear region of the power amplifier characteristic curves, where the message indicating the set of power amplifier characteristics and the set of power backoff values is transmitted based on receiving the indication of the capability.

In some examples, to support message, the power amplifier message component 825 may be configured as or otherwise support a means for an indication, for each of a plurality of antenna ports of the first device, for each of a plurality of antenna panels of the first device, for each of a plurality of power amplifiers of the first device, for each of a plurality of polarizations supported at the first device, or for any combination thereof, of a respective set of power amplifier characteristics and a respective set of power backoff values, where transmitting the signaling is further based on the set of power amplifier characteristics and the set of power backoff values associated with an antenna port of the plurality of antenna ports, an antenna panel of the plurality of antenna panels, a power amplifier of the plurality of power amplifiers, a polarization of the plurality of polarizations, or any combination thereof, of the first device.

In some examples, to support message, the power amplifier message component 825 may be configured as or otherwise support a means for an indication, for each of a plurality of modulation constellation types, for each of a plurality of modulation orders, for each of a plurality of MCSs, for each of a plurality of constellation radii, or for any combination thereof, of a respective set of power amplifier characteristics and a respective set of power backoff values, where transmitting the signaling is further based on the set of power amplifier characteristics and the set of power backoff values associated with a modulation constellation type of the plurality of modulation constellation types, a modulation order of the plurality of modulation orders, a MCS of the plurality of MCSs, a constellation radius of the plurality of constellation radii, or any combination thereof, of the first device.

In some examples, to support message, the power amplifier message component 825 may be configured as or otherwise support a means for an indication, for each of the one or more modulation configurations of the first device, of a debiasing factor, where transmitting the signaling is further based on the debiasing factor for a modulation configuration of the one or more modulation configurations.

In some examples, the enabling message component 840 may be configured as or otherwise support a means for receiving, from the second device, an indication to enable or disable transmission with the transmission power in the non-linear region of the power amplifier characteristic curves.

In some examples, the indication to enable or disable transmission with the transmission power in the non-linear region of the power amplifier characteristic curves is received via DCI, a MAC CE, RRC signaling, or any combination thereof.

In some examples, the indication to enable or disable transmission with the transmission power in the non-linear region is received based on a transmission rank, a precoding, a geolocation of the first device, an indicated error for the set of power amplifier characteristics and the set of power backoff values, a power sensitivity or battery level of the first device, or any combination thereof.

In some examples, the enabling message component 840 may be configured as or otherwise support a means for transmitting, to the second device, an indication to enable or disable reception with the transmission power in the non-linear region of the power amplifier characteristic curves.

In some examples, to support message, the power amplifier message component 825 may be configured as or otherwise support a means for an indication, for each of a plurality of temperature ranges of a power amplifier of the first device, of a respective set of power amplifier characteristics and a respective set of power backoff values, where transmitting the signaling is based on the set of power amplifier characteristics and the set of power backoff values associated with a temperature range of the power amplifier of the first device.

In some examples, the temperature component 850 may be configured as or otherwise support a means for transmitting, to the second device, an indication of a temperature of the power amplifier of the first device.

In some examples, the power amplifier request component 845 may be configured as or otherwise support a means for receiving a request from the second device to transmit the message indicating the set of power amplifier characteristics and the set of power backoff values, where the indication is transmitted based on receiving the request.

In some examples, the message is transmitted via control information signaling, a MAC CE, RRC signaling, or any combination thereof.

Figure 9:
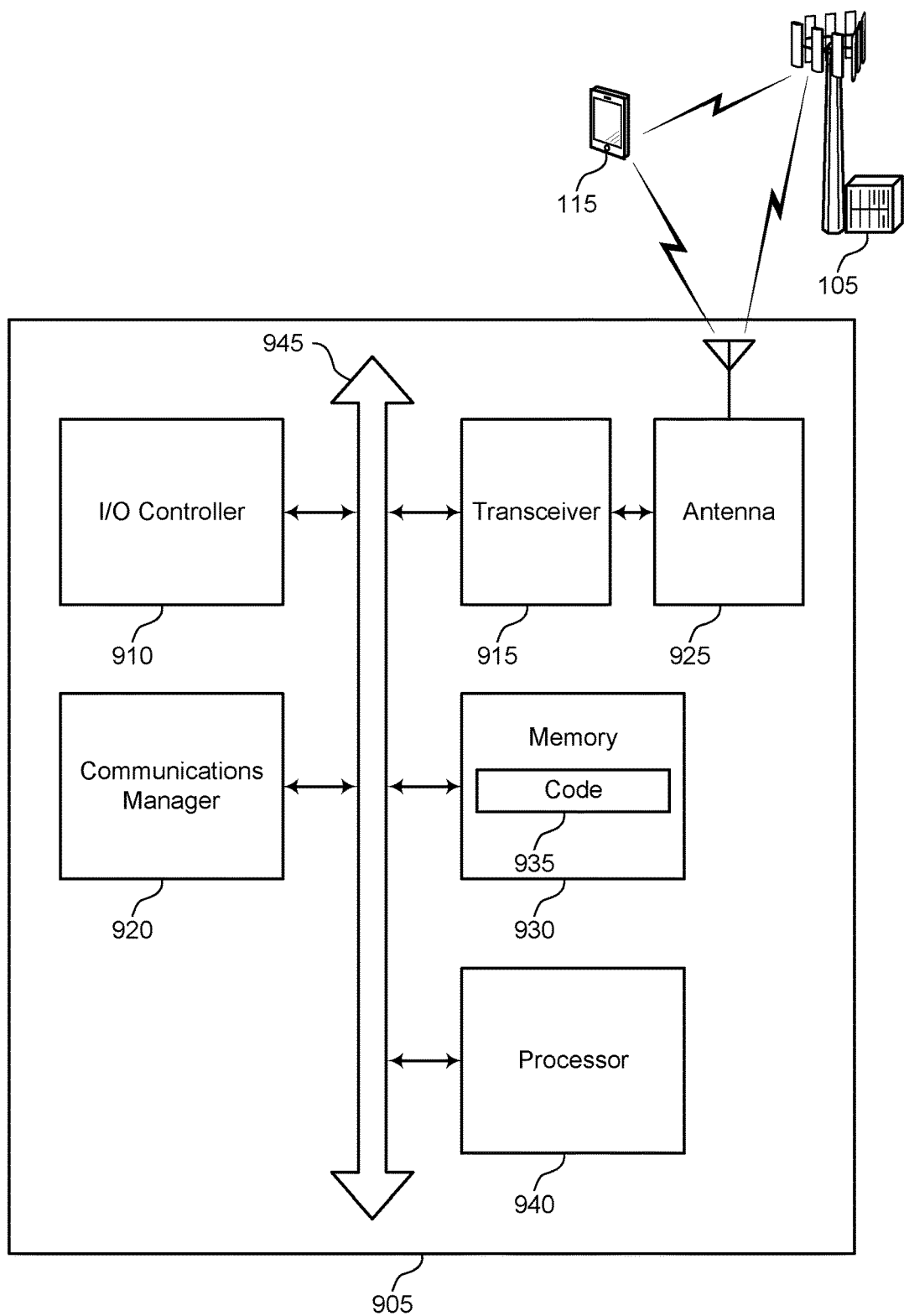
FIG. 9 shows a diagram of a system including a device that supports power characteristics reporting for signaling using single carrier modulation in accordance with aspects of the present disclosure.

FIG. 9 shows a diagram of a system including a device 905 that supports power characteristics reporting for signaling using single carrier modulation in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (for example, operatively, communicatively, functionally, electronically, electrically) via one or more buses (for example, a bus 945).

The I/O controller 910 may manage input and output signals for the device 905. The I/O controller 910 may also manage peripherals not integrated into the device 905. In some examples, the I/O controller 910 may represent a physical connection or port to an external peripheral. In some examples, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some examples, the I/O controller 910 may be implemented as part of a processor, such as the processor 940. In some examples, a user may interact with the device 905 via the I/O controller 910 or via hardware components controlled by the I/O controller 910.

In some examples, the device 905 may include a single antenna 925. However, in some other examples, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some examples, the code 935 may not be directly executable by the processor 940 but may cause a computer (for example, when compiled and executed) to perform functions described herein. In some examples, the memory 930 may contain, among other things, a basic I/O system (BIOS) which may control basic hardware or software operation such as the interaction with peripheral components or devices.

The processor 940 may include an intelligent hardware device (for example, a general-purpose processor, a DSP, a CPU, a microcontroller, an ASIC, a field-programmable gate array (FPGA), a programmable logic device, a discrete gate or transistor logic component, a discrete hardware component, or any combination thereof). In some examples, the processor 940 may be configured to operate a memory array using a memory controller. In some other examples, a memory controller may be integrated into the processor 940. The processor 940 may be configured to execute computer-readable instructions stored in a memory (for example, the memory 930) to cause the device 905 to perform various functions (for example, functions or tasks supporting power characteristics reporting for signaling using single carrier modulation). For example, the device 905 or a component of the device 905 may include a processor 940 and memory 930 coupled with or to the processor 940, the processor 940 and memory 930 configured to perform various functions described herein.

The communications manager 920 may support wireless communications at a first device in accordance with examples as disclosed herein. For example, the communications manager 920 may be configured as or otherwise support a means for transmitting, to a second device, a message indicating a set of power amplifier characteristics and a set of power backoff values for each of one or more modulation configurations of the first device, the set of power backoff values being associated with a non-linear region of power amplifier characteristic curves of the first device. The communications manager 920 may be configured as or otherwise support a means for transmitting, to the second device, based on transmitting the message indicating the set of power amplifier characteristics and the set of power backoff values, signaling using a single carrier waveform at a transmission power in the non-linear region of the power amplifier characteristic curves based on applying one or more power backoff values of the set of power backoff values.

By including or configuring the communications manager 920 in accordance with examples as described herein, the device 905 may support techniques for increased energy efficiency, improved coverage (for example, rate over range), increased maximal and average transmission power, decreased complexity, and power management, among other advantages.

In some examples, the communications manager 920 may be configured to perform various operations (for example, receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of power characteristics reporting for signaling using single carrier modulation as described herein, or the processor 940 and the memory 930 may be otherwise configured to perform or support such operations.

Figure 10:
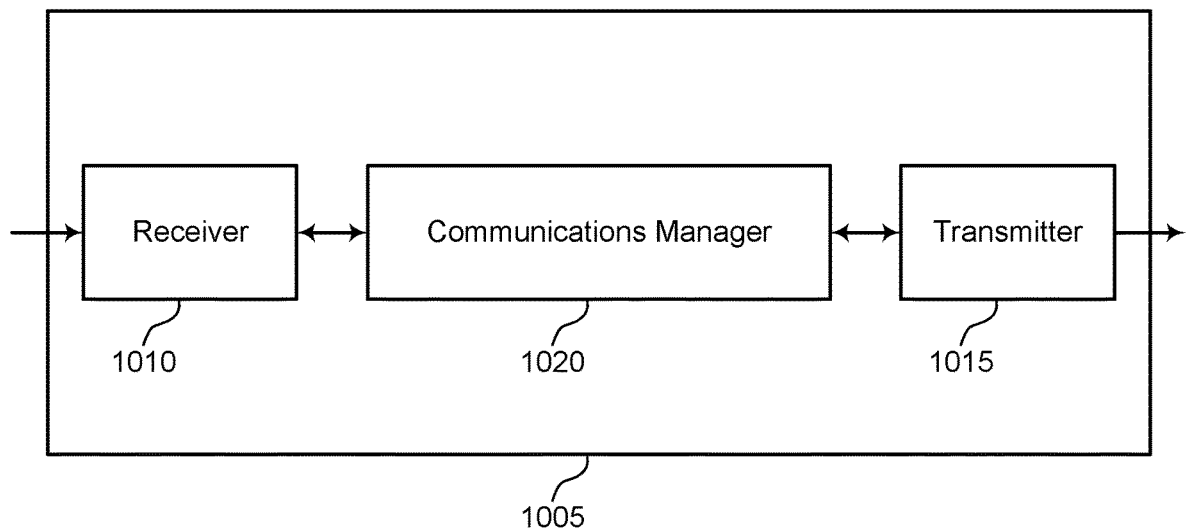
FIGS. 10 and 11 show block diagrams of devices that support power characteristics reporting for signaling using single carrier modulation in accordance with aspects of the present disclosure.

FIG. 10 shows a block diagram of a device 1005 that supports power characteristics reporting for signaling using single carrier modulation in accordance with aspects of the present disclosure. The device 1005 may be an example of aspects of a base station 105 as described herein. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for receiving information such as packets, user data, control information, or any combination thereof associated with various information channels (for example, control channels, data channels, information channels related to power characteristics reporting for signaling using single carrier modulation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to power characteristics reporting for signaling using single carrier modulation). In some examples, the transmitter 1015 may be co-located with a receiver 1010 in a transceiver component. The transmitter 1015 may utilize a single antenna or a set of multiple antennas.

The communications manager 1020, the receiver 1010, the transmitter 1015, or various combinations thereof or various components thereof may be examples of means for performing various aspects of power characteristics reporting for signaling using single carrier modulation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (for example, receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications in accordance with examples as disclosed herein. For example, the communications manager 1020 may be configured as or otherwise support a means for a first device receiving, from a second device, a message indicating a set of power amplifier characteristics and a set of power backoff values for each of one or more modulation configurations of the second device, the set of power backoff values being associated with a non-linear region of power amplifier characteristic curves of the second device. The communications manager 1020 may be configured as or otherwise support a means for receiving, from the second device based on receiving the message, signaling using a single carrier waveform at a transmission power in the non-linear region of the power amplifier characteristic curves based on a modulation configuration of the signaling and the set of power amplifier characteristics and the set of power backoff values.

By including or configuring the communications manager 1020 in accordance with examples as described herein, the device 1005 (for example, a processor controlling or otherwise coupled to the receiver 1010, the transmitter 1015, the communications manager 1020, or a combination thereof) may support techniques for increased energy efficiency, improved coverage (for example, rate over range), increased maximal and average transmission power, decreased complexity, and power management, among other advantages.

Figure 11:
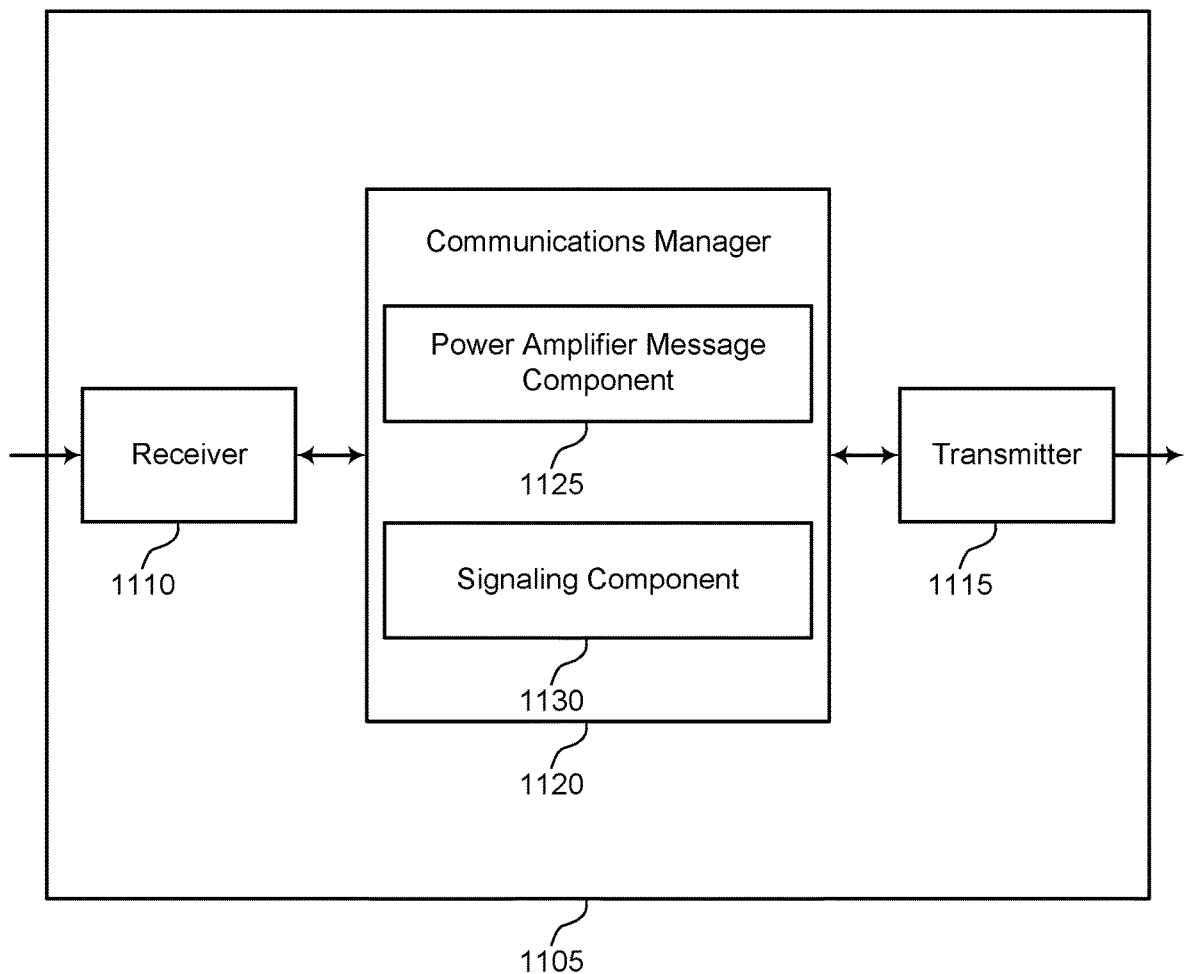

FIG. 11 shows a block diagram of a device 1105 that supports power characteristics reporting for signaling using single carrier modulation in accordance with aspects of the present disclosure. The device 1105 may be an example of aspects of a device 1005 or a base station 105 as described herein. The device 1105 may include a receiver 1110, a transmitter 1115, and a communications manager 1120. The communications manager 1120 can be implemented, at least in part, by one or both of a modem and a processor. Each of these components may be in communication with one another (for example, via one or more buses).

The receiver 1110 may provide a means for receiving information such as packets, user data, control information, or any combination thereof associated with various information channels (for example, control channels, data channels, information channels related to power characteristics reporting for signaling using single carrier modulation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (for example, control channels, data channels, information channels related to power characteristics reporting for signaling using single carrier modulation). In some examples, the transmitter 1115 may be co-located with a receiver 1110 in a transceiver component. The transmitter 1115 may utilize a single antenna or a set of multiple antennas.

The device 1105, or various components thereof, may be an example of means for performing various aspects of power characteristics reporting for signaling using single carrier modulation as described herein. For example, the communications manager 1120 may include a power amplifier message component 1125 a signaling component 1130, or any combination thereof. In some examples, the communications manager 1120, or various components thereof, may be configured to perform various operations (for example, receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications in accordance with examples as disclosed herein. The power amplifier message component 1125 may be configured as or otherwise support a means for a first device, receiving, from a second device, a message indicating a set of power amplifier characteristics and a set of power backoff values for each of one or more modulation configurations of the second device, the set of power backoff values being associated with a non-linear region of power amplifier characteristic curves of the second device. The signaling component 1130 may be configured as or otherwise support a means for receiving, from the second device based on receiving the message, signaling using a single carrier waveform at a transmission power in the non-linear region of the power amplifier characteristic curves based on a modulation configuration of the signaling and the set of power amplifier characteristics and the set of power backoff values.

Figure 12:
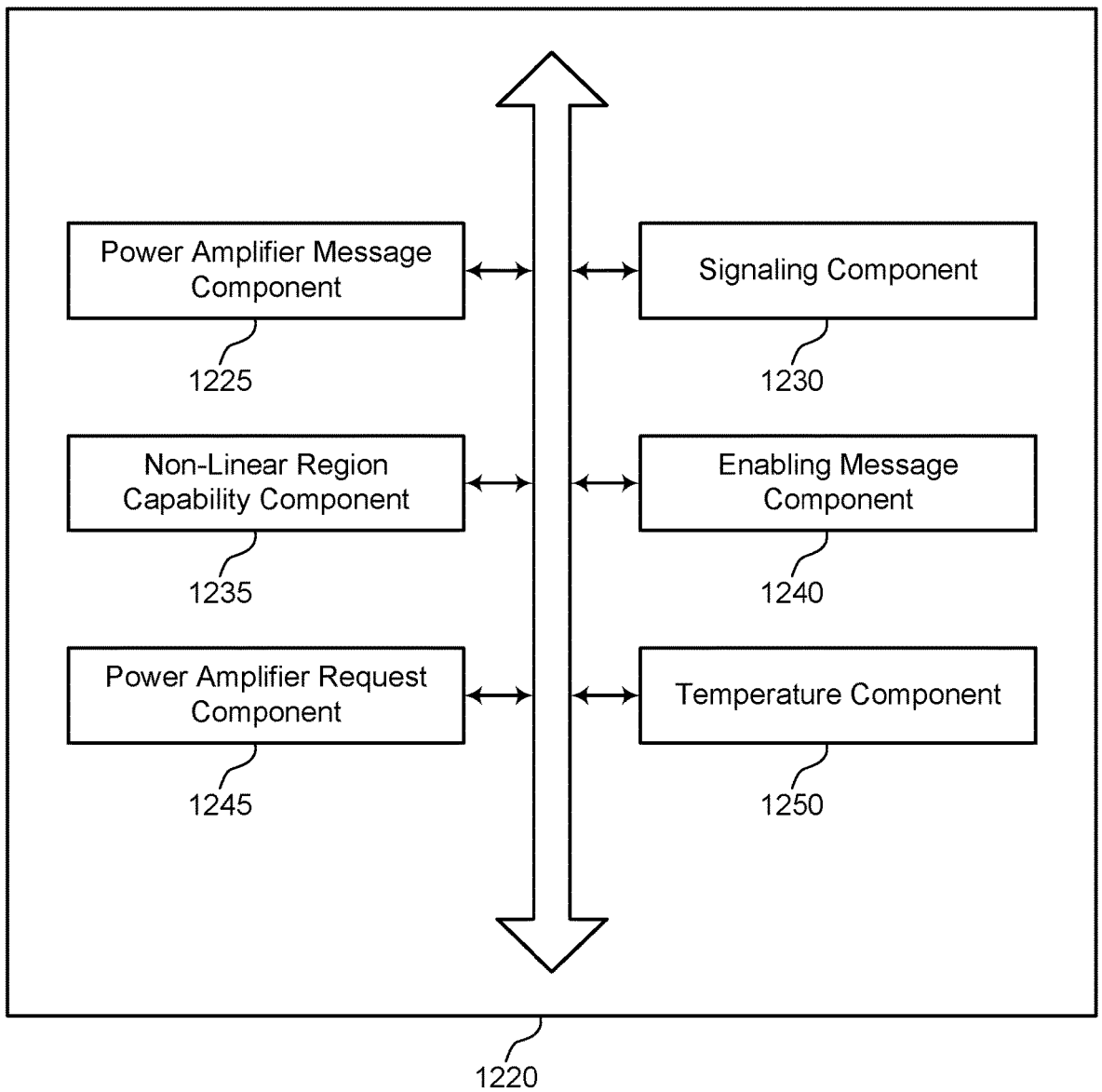
FIG. 12 shows a block diagram of a communications manager that supports power characteristics reporting for signaling using single carrier modulation in accordance with aspects of the present disclosure.

FIG. 12 shows a block diagram of a communications manager 1220 that supports power characteristics reporting for signaling using single carrier modulation in accordance with aspects of the present disclosure. The communications manager 1220, or various components thereof, may be an example of means for performing various aspects of power characteristics reporting for signaling using single carrier modulation as described herein. For example, the communications manager 1220 may include a power amplifier message component 1225, a signaling component 1230, a non-linear region capability component 1235, an enabling message component 1240, a power amplifier request component 1245, a temperature component 1250, or any combination thereof. Each of these components may communicate, directly or indirectly, with one another (for example, via one or more buses).

The communications manager 1220 may support wireless communications in accordance with examples as disclosed herein. The power amplifier message component 1225 may be configured as or otherwise support a means for a first device receiving, from a second device, a message indicating a set of power amplifier characteristics and a set of power backoff values for each of one or more modulation configurations of the second device, the set of power backoff values being associated with a non-linear region of power amplifier characteristic curves of the second device. The signaling component 1230 may be configured as or otherwise support a means for receiving, from the second device based on receiving the message, signaling using a single carrier waveform at a transmission power in the non-linear region of the power amplifier characteristic curves based on a modulation configuration of the signaling and the set of power amplifier characteristics and the set of power backoff values.

In some examples, to support message, the power amplifier message component 1225 may be configured as or otherwise support a means for an indication of a capability of the second device to support transmission with the transmission power in the non-linear region of the power amplifier characteristic curves.

In some examples, the non-linear region capability component 1235 may be configured as or otherwise support a means for transmitting, to the second device, an indication of a capability to receive signaling with the transmission power in the non-linear region of the power amplifier characteristic curves, where the message indicating the set of power amplifier characteristics and the set of power backoff values is received based on transmitting the indication of the capability.

In some examples, to support message, the power amplifier message component 1225 may be configured as or otherwise support a means for an indication, for each of a plurality of antenna ports of the second device, for each of a plurality of antenna panels of the second device, for each of a plurality of power amplifiers of the second device, for each of a plurality of polarizations supported at the second device, or for any combination thereof, a respective set of power amplifier characteristics and a respective set of power backoff values, where receiving the signaling is based on the respective set of power amplifier characteristics and the respective set of power backoff values associated with an antenna port of the plurality of antenna ports, an antenna panel of the plurality of antenna panels, a power amplifier of the plurality of power amplifiers, a polarization of the plurality of polarizations, or any combination thereof, of the second device.

In some examples, to support message, the power amplifier message component 1225 may be configured as or otherwise support a means for an indication, for each of a plurality of modulation constellation types of the second device, for each of a plurality of modulation orders of the second device, for each of a plurality of MCSs of the second device, for each of a plurality of constellation radii, or for any combination thereof, a respective set of power amplifier characteristics and a respective set of power backoff values, where receiving the signaling is further based on the respective set of power amplifier characteristics and the respective set of power backoff values associated with a modulation constellation type of the plurality of modulation constellation types, a modulation order of the plurality of modulation orders, a MCS of the plurality of MCSs, a constellation radius of the plurality of constellation radii, or any combination thereof, of the second device.

In some examples, to support message, the power amplifier message component 1225 may be configured as or otherwise support a means for an indication of a debiasing factor for each of the one or more modulation configurations of the second device, where receiving the signaling is further based on the debiasing factor for a modulation configuration of the second device.

In some examples, the enabling message component 1240 may be configured as or otherwise support a means for transmitting, to the second device, an indication to enable or disable transmission with the transmission power in the non-linear region of the power amplifier characteristic curves.

In some examples, the indication to enable or disable transmission with the transmission power in the non-linear region of the power amplifier characteristic curves is transmitted via DCI, a MAC CE, RRC signaling, or any combination thereof.

In some examples, the indication to enable or disable transmission with the transmission power in the non-linear region is transmitted based on a transmission rank, a precoding, a geolocation of the second device, an error for the set of power amplifier characteristics and the set of power backoff values, a power sensitivity or battery level of the second device, or any combination thereof.

In some examples, the enabling message component 1240 may be configured as or otherwise support a means for receiving, from the second device, an indication to enable or disable reception with the transmission power in the non-linear region of the power amplifier characteristic curves.

In some examples, to support message, the power amplifier message component 1225 may be configured as or otherwise support a means for an indication, for each of a plurality of temperature ranges of a power amplifier of the second device, of a respective set of power amplifier characteristics and a respective set of power backoff values.

In some examples, the temperature component 1250 may be configured as or otherwise support a means for receiving, from the second device, an indication of a temperature of the power amplifier of the second device.

In some examples, the power amplifier request component 1245 may be configured as or otherwise support a means for transmitting a request to the second device to transmit the message indicating the set of power amplifier characteristics and the set of power backoff values, where the message is received based on transmitting the request.

In some examples, the message is received via control information signaling, a MAC CE, RRC signaling, or any combination thereof.

Figure 13:
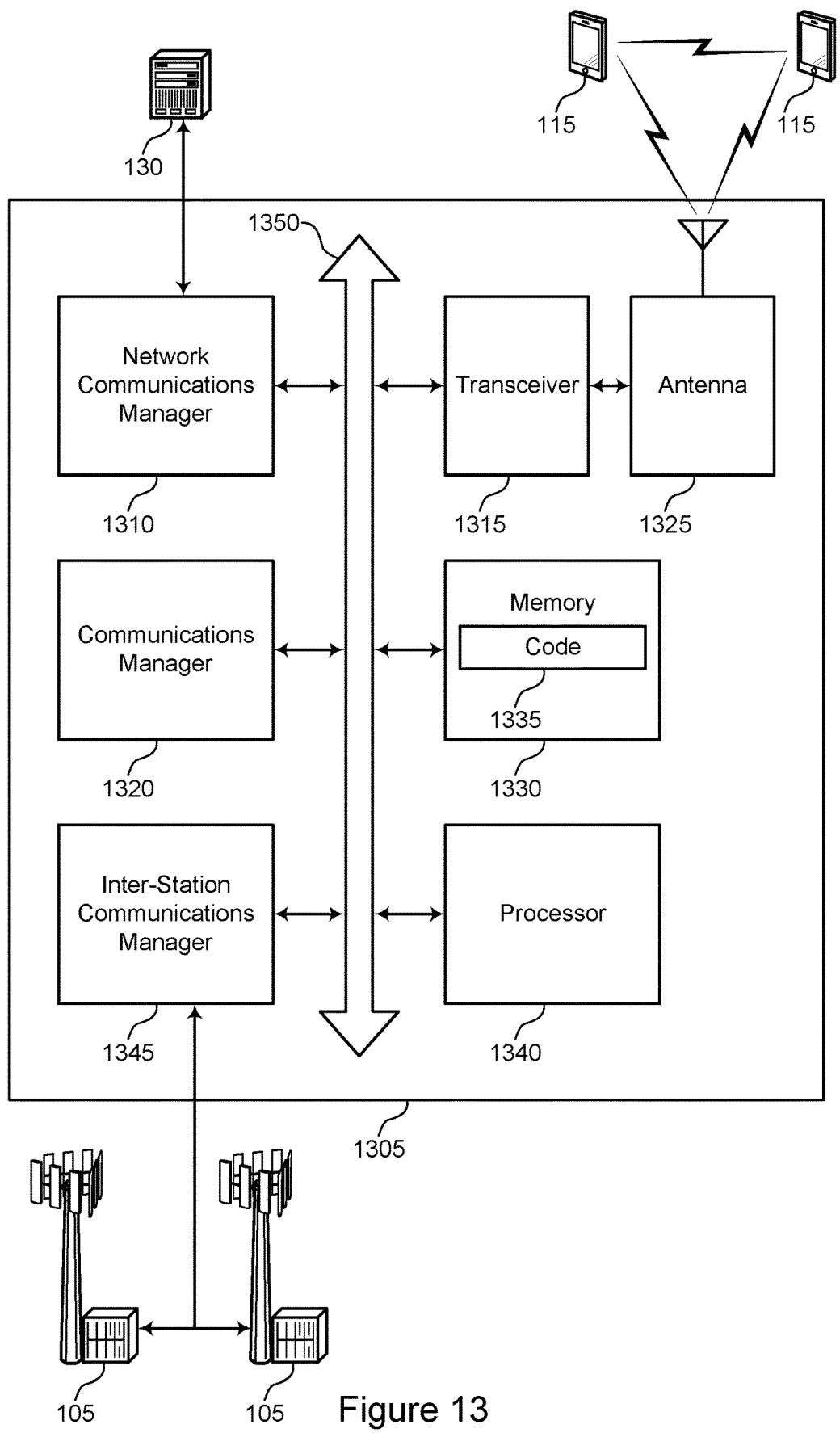
FIG. 13 shows a diagram of a system including a device that supports power characteristics reporting for signaling using single carrier modulation in accordance with aspects of the present disclosure.

FIG. 13 shows a diagram of a system including a device 1305 that supports power characteristics reporting for signaling using single carrier modulation in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (for example, operatively, communicatively, functionally, electronically, electrically) via one or more buses (for example, a bus 1350).

The network communications manager 1310 may manage communications with a core network 130 (for example, via one or more wired backhaul links). For example, the network communications manager 1310 may manage the transfer of data communications for client devices, such as one or more UEs 115.

In some examples, the device 1305 may include a single antenna 1325. However, in some other examples the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some examples, the code 1335 may not be directly executable by the processor 1340 but may cause a computer (for example, when compiled and executed) to perform functions described herein. In some examples, the memory 1330 may contain, among other things, a BIOS which may control basic hardware or software operation such as the interaction with peripheral components or devices.

The processor 1340 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In some other examples, a memory controller may be integrated into the processor 1340. The processor 1340 may be configured to execute computer-readable instructions stored in a memory (for example, the memory 1330) to cause the device 1305 to perform various functions (for example, functions or tasks supporting power characteristics reporting for signaling using single carrier modulation). For example, the device 1305 or a component of the device 1305 may include a processor 1340 and memory 1330 coupled with or to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications in accordance with examples as disclosed herein. For example, the communications manager 1320, of a first device, may be configured as or otherwise support a means for receiving, from a second device, a message indicating a set of power amplifier characteristics and a set of power backoff values for each of one or more modulation configurations of the second device, the set of power backoff values being associated with a non-linear region of power amplifier characteristic curves of the second device. The communications manager 1320 may be configured as or otherwise support a means for receiving, from the second device based on receiving the message, signaling using a single carrier waveform at a transmission power in the non-linear region of the power amplifier characteristic curves based on a modulation configuration of the signaling and the set of power amplifier characteristics and the set of power backoff values.

By including or configuring the communications manager 1320 in accordance with examples as described herein, the device 1305 may support techniques for increased energy efficiency, improved coverage (for example, rate over range), increased maximal and average transmission power, decreased complexity, and power management, among other advantages.

In some examples, the communications manager 1320 may be configured to perform various operations (for example, receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of power characteristics reporting for signaling using single carrier modulation as described herein, or the processor 1340 and the memory 1330 may be otherwise configured to perform or support such operations.

Figure 14:
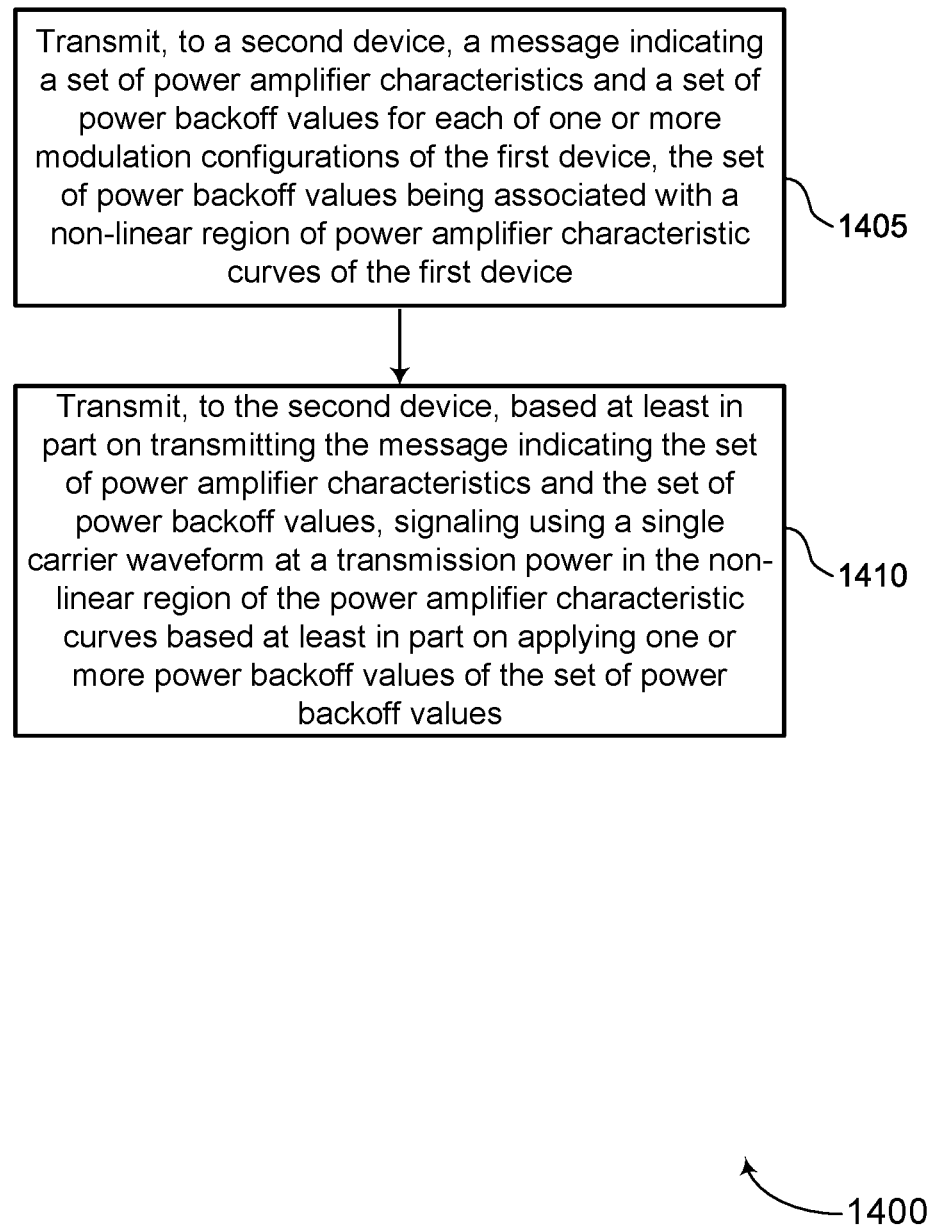
FIGS. 14-16 show flowcharts illustrating methods that support power characteristics reporting for signaling using single carrier modulation in accordance with aspects of the present disclosure.

FIG. 14 shows a flowchart illustrating a method 1400 that supports power characteristics reporting for signaling using single carrier modulation in accordance with aspects of the present disclosure. The operations of the method 1400 may be implemented by a UE or its components as described herein. For example, the operations of the method 1400 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1405, the method may include transmitting, to a second device, a message indicating a set of power amplifier characteristics and a set of power backoff values for each of one or more modulation configurations of the first device, the set of power backoff values being associated with a non-linear region of power amplifier characteristic curves of the first device. The operations of 1405 may be performed in accordance with examples as disclosed herein. In some examples, aspects of the operations of 1405 may be performed by a power amplifier message component 825 as described with reference to FIG. 8.

At 1410, the method may include transmitting, to the second device, based on transmitting the message indicating the set of power amplifier characteristics and the set of power backoff values, signaling using a single carrier waveform at a transmission power in the non-linear region of the power amplifier characteristic curves based on applying one or more power backoff values of the set of power backoff values. The operations of 1410 may be performed in accordance with examples as disclosed herein. In some examples, aspects of the operations of 1410 may be performed by a signaling component 830 as described with reference to FIG. 8.

Figure 15:
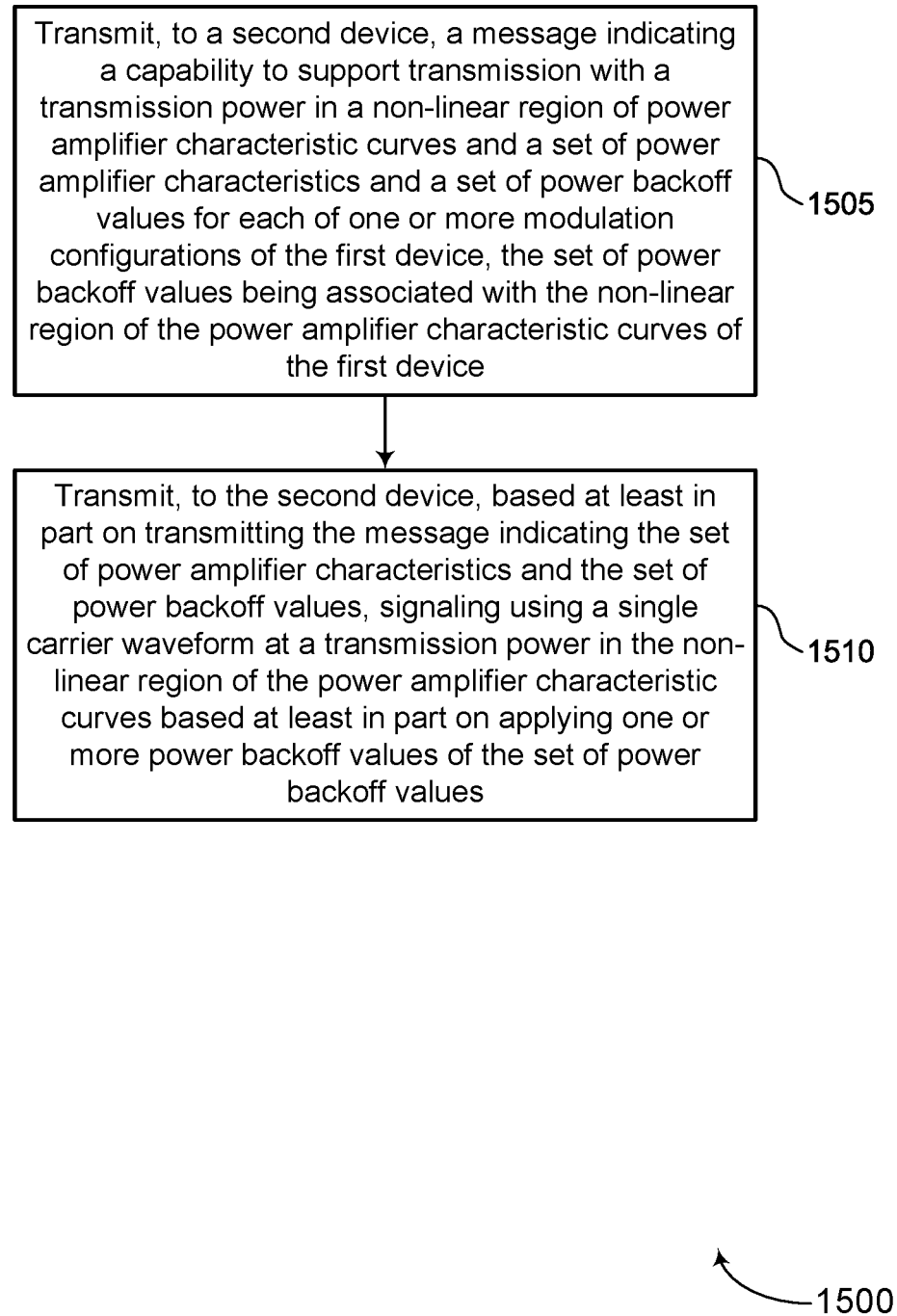

FIG. 15 shows a flowchart illustrating a method 1500 that supports power characteristics reporting for signaling using single carrier modulation in accordance with aspects of the present disclosure. The operations of the method 1500 may be implemented by a UE or its components as described herein. For example, the operations of the method 1500 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1505, the method may include transmitting, to a second device, a message indicating a capability to support transmission with a transmission power in a non-linear region of power amplifier characteristic curves and a set of power amplifier characteristics and a set of power backoff values for each of one or more modulation configurations of the first device, the set of power backoff values being associated with the non-linear region of the power amplifier characteristic curves of the first device. The operations of 1505 may be performed in accordance with examples as disclosed herein. In some examples, aspects of the operations of 1505 may be performed by a power amplifier message component 825 as described with reference to FIG. 8.

At 1510, the method may include transmitting, to the second device, based on transmitting the message indicating the set of power amplifier characteristics and the set of power backoff values, signaling using a single carrier waveform at a transmission power in the non-linear region of the power amplifier characteristic curves based on applying one or more power backoff values of the set of power backoff values. The operations of 1510 may be performed in accordance with examples as disclosed herein. In some examples, aspects of the operations of 1510 may be performed by a signaling component 830 as described with reference to FIG. 8.

Figure 16:
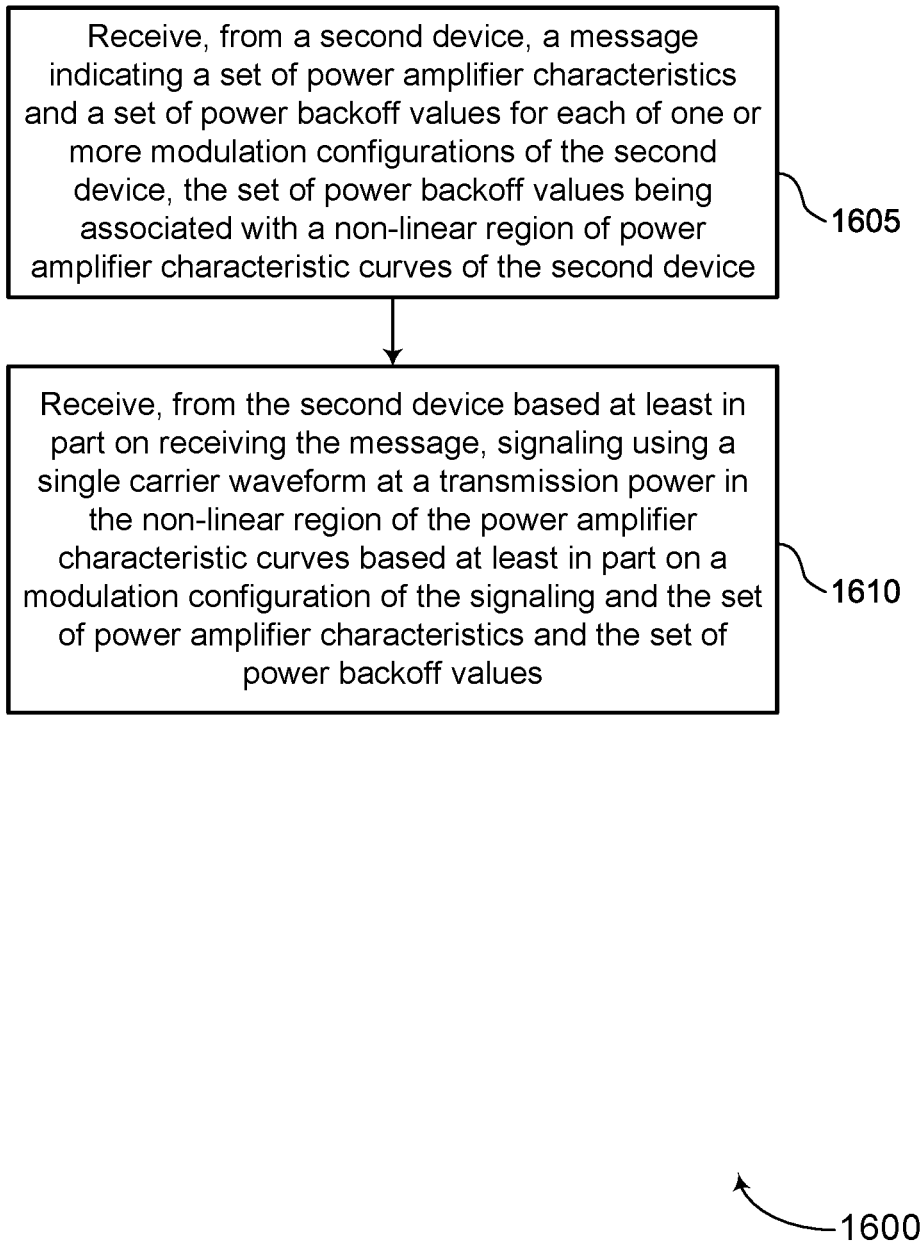

FIG. 16 shows a flowchart illustrating a method 1600 that supports power characteristics reporting for signaling using single carrier modulation in accordance with aspects of the present disclosure. The operations of the method 1600 may be implemented by a base station or its components as described herein. For example, the operations of the method 1600 may be performed by a base station 105 as described with reference to FIGS. 1-5 and 10-13. In some examples, a base station may execute a set of instructions to control the functional elements of the base station to perform the described functions. Additionally or alternatively, the base station may perform aspects of the described functions using special-purpose hardware.

At 1605, the method may include a first device receiving, from a second device, a message indicating a set of power amplifier characteristics and a set of power backoff values for each of one or more modulation configurations of the second device, the set of power backoff values being associated with a non-linear region of power amplifier characteristic curves of the second device. The operations of 1605 may be performed in accordance with examples as disclosed herein. In some examples, aspects of the operations of 1605 may be performed by a power amplifier message component 1225 as described with reference to FIG. 12.

At 1610, the method may include receiving, from the second device based on receiving the message, signaling using a single carrier waveform at a transmission power in the non-linear region of the power amplifier characteristic curves based on a modulation configuration of the signaling and the set of power amplifier characteristics and the set of power backoff values. The operations of 1610 may be performed in accordance with examples as disclosed herein. In some examples, aspects of the operations of 1610 may be performed by a signaling component 1230 as described with reference to FIG. 12.

The following provides an overview of aspects of the present disclosure:

Aspect 1: A method for wireless communications at a first device, comprising: transmitting, to a second device, a message indicating a set of power amplifier characteristics and a set of power backoff values for each of one or more modulation configurations of the first device, the set of power backoff values being associated with a non-linear region of power amplifier characteristic curves of the first device; and transmitting, to the second device, based at least in part on transmitting the message indicating the set of power amplifier characteristics and the set of power backoff values, signaling using a single carrier waveform at a transmission power in the non-linear region of the power amplifier characteristic curves based at least in part on applying one or more power backoff values of the set of power backoff values.

Aspect 2: The method of aspect 1, wherein the message further comprises an indication of a capability to support transmission with the transmission power in the non-linear region of the power amplifier characteristic curves, transmitting the signaling is based at least in part on having the capability.

Aspect 3: The method of any of aspects 1 through 2, further comprising receiving, from the second device, an indication of a capability for the second device to receive signaling with the transmission power in the non-linear region of the power amplifier characteristic curves, wherein the message indicating the set of power amplifier characteristics and the set of power backoff values is transmitted based at least in part on receiving the indication of the capability.

Aspect 4: The method of any of aspects 1 through 3, wherein the message comprises an indication, for each of a plurality of antenna ports of the first device, for each of a plurality of antenna panels of the first device, for each of a plurality of power amplifiers of the first device, for each of a plurality of polarizations supported at the first device, or for any combination thereof, of a respective set of power amplifier characteristics and a respective set of power backoff values, transmitting the signaling is further based at least in part on the set of power amplifier characteristics and the set of power backoff values associated with an antenna port of the plurality of antenna ports, an antenna panel of the plurality of antenna panels, a power amplifier of the plurality of power amplifiers, a polarization of the plurality of polarizations, or any combination thereof, of the first device.

Aspect 5: The method of any of aspects 1 through 4, wherein the message comprises an indication, for each of a plurality of modulation constellation types, for each of a plurality of modulation orders, for each of a plurality of MCSs, for each of a plurality of constellation radii, or for any combination thereof, of a respective set of power amplifier characteristics and a respective set of power backoff values, transmitting the signaling is further based at least in part on the set of power amplifier characteristics and the set of power backoff values associated with a modulation constellation type of the plurality of modulation constellation types, a modulation order of the plurality of modulation orders, a MCS of the plurality of MCSs, a constellation radius of the plurality of constellation radii, or any combination thereof, of the first device.

Aspect 6: The method of any of aspects 1 through 5, wherein the message further comprises an indication, for each of the one or more modulation configurations of the first device, of a debiasing factor, transmitting the signaling is further based at least in part on the debiasing factor for a modulation configuration of the one or more modulation configurations.

Aspect 7: The method of any of aspects 1 through 6, wherein the message comprises an indication, for each of a plurality of temperature ranges of a power amplifier of the first device, of a respective set of power amplifier characteristics and a respective set of power backoff values, transmitting the signaling is based at least in part on the set of power amplifier characteristics and the set of power backoff values associated with a temperature range of the power amplifier of the first device.

Aspect 8: The method of aspect 7, further comprising transmitting, to the second device, an indication of a temperature of the power amplifier of the first device.

Aspect 9: The method of any of aspects 1 through 8, further comprising receiving, from the second device, an indication to enable or disable transmission with the transmission power in the non-linear region of the power amplifier characteristic curves.

Aspect 10: The method of aspect 9, wherein the indication to enable or disable transmission with the transmission power in the non-linear region of the power amplifier characteristic curves is received via downlink control information, a medium access control control element, radio resource control signaling, or any combination thereof.

Aspect 11: The method of any of aspects 9 through 10, wherein the indication to enable or disable transmission with the transmission power in the non-linear region is received based at least in part on a transmission rank, a precoding, a geolocation of the first device, an indicated error for the set of power amplifier characteristics and the set of power backoff values, a power sensitivity or battery level of the first device, or any combination thereof.

Aspect 12: The method of any of aspects 1 through 11, further comprising transmitting, to the second device, an indication to enable or disable reception with the transmission power in the non-linear region of the power amplifier characteristic curves.

Aspect 13: The method of any of aspects 1 through 12, further comprising receiving a request from the second device to transmit the message indicating the set of power amplifier characteristics and the set of power backoff values, wherein the indication is transmitted based at least in part on receiving the request.

Aspect 14: The method of any of aspects 1 through 13, wherein the message is transmitted via control information signaling, a medium access control control element, radio resource control signaling, or any combination thereof.

Aspect 15: A method for wireless communications at a first device, comprising: receiving, from a second device, a message indicating a set of power amplifier characteristics and a set of power backoff values for each of one or more modulation configurations of the second device, the set of power backoff values being associated with a non-linear region of power amplifier characteristic curves of the second device; and receiving, from the second device based at least in part on receiving the message, signaling using a single carrier waveform at a transmission power in the non-linear region of the power amplifier characteristic curves based at least in part on a modulation configuration of the signaling and the set of power amplifier characteristics and the set of power backoff values.

Aspect 16: The method of aspect 15, wherein the message further comprises an indication of a capability of the second device to support transmission with the transmission power in the non-linear region of the power amplifier characteristic curves.

Aspect 17: The method of any of aspects 15 through 16, further comprising transmitting, to the second device, an indication of a capability to receive signaling with the transmission power in the non-linear region of the power amplifier characteristic curves, wherein the message indicating the set of power amplifier characteristics and the set of power backoff values is received based at least in part on transmitting the indication of the capability.

Aspect 18: The method of any of aspects 15 through 17, wherein the message comprises an indication, for each of a plurality of antenna ports of the second device, for each of a plurality of antenna panels of the second device, for each of a plurality of power amplifiers of the second device, for each of a plurality of polarizations supported at the second device, or for any combination thereof, a respective set of power amplifier characteristics and a respective set of power backoff values, receiving the signaling is based at least in part on the respective set of power amplifier characteristics and the respective set of power backoff values associated with an antenna port of the plurality of antenna ports, an antenna panel of the plurality of antenna panels, a power amplifier of the plurality of power amplifiers, a polarization of the plurality of polarizations, or any combination thereof, of the second device.

Aspect 19: The method of any of aspects 15 through 18, wherein the message comprises an indication, for each of a plurality of modulation constellation types of the second device, for each of a plurality of modulation orders of the second device, for each of a plurality of MCSs of the second device, for each of a plurality of constellation radii, or for any combination thereof, a respective set of power amplifier characteristics and a respective set of power backoff values, receiving the signaling is further based at least in part on the respective set of power amplifier characteristics and the respective set of power backoff values associated with a modulation constellation type of the plurality of modulation constellation types, a modulation order of the plurality of modulation orders, a MCS of the plurality of MCSs, a constellation radius of the plurality of constellation radii, or any combination thereof, of the second device.

Aspect 20: The method of any of aspects 15 through 19, wherein the message further comprises an indication, for each of the one or more modulation configurations of the second device, of a debiasing factor, receiving the signaling is further based at least in part on the debiasing factor for a modulation configuration of the one or more modulation configurations.

Aspect 21: The method of any of aspects 15 through 20, wherein the message comprises an indication, for each of a plurality of temperature ranges of a power amplifier of the second device, of a respective set of power amplifier characteristics and a respective set of power backoff values.

Aspect 22: The method of aspect 21, further comprising receiving, from the second device, an indication of a temperature of the power amplifier of the second device.

Aspect 23: The method of any of aspects 15 through 22, further comprising transmitting, to the second device, an indication to enable or disable transmission with the transmission power in the non-linear region of the power amplifier characteristic curves.

Aspect 24: The method of aspect 23, wherein the indication to enable or disable transmission with the transmission power in the non-linear region of the power amplifier characteristic curves is transmitted via downlink control information, a medium access control control element, radio resource control signaling, or any combination thereof.

Aspect 25: The method of any of aspects 23 through 24, wherein the indication to enable or disable transmission with the transmission power in the non-linear region is transmitted based at least in part on a transmission rank, a precoding, a geolocation of the second device, an error for the set of power amplifier characteristics and the set of power backoff values, a power sensitivity or battery level of the second device, or any combination thereof.

Aspect 26: The method of any of aspects 15 through 25, further comprising receiving, from the second device, an indication to enable or disable reception with the transmission power in the non-linear region of the power amplifier characteristic curves.

Aspect 27: The method of any of aspects 15 through 26, further comprising transmitting a request to the second device to transmit the message indicating the set of power amplifier characteristics and the set of power backoff values, wherein the message is received based at least in part on transmitting the request.

Aspect 28: The method of any of aspects 15 through 27, wherein the message is received via control information signaling, a medium access control control element, radio resource control signaling, or any combination thereof.

Aspect 29: An apparatus for wireless communications at a first device, comprising a processor; memory coupled with the processor; and instructions stored in the memory and executable by the processor to cause the apparatus to perform a method of any of aspects 1 through 14.

Aspect 30: An apparatus for wireless communications at a first device, comprising at least one means for performing a method of any of aspects 1 through 14.

Aspect 31: A non-transitory computer-readable medium storing code for wireless communications at a first device, the code comprising instructions executable by a processor to perform a method of any of aspects 1 through 14.

Aspect 32: An apparatus for wireless communications at a first device, comprising a processor; memory coupled with the processor; and instructions stored in the memory and executable by the processor to cause the apparatus to perform a method of any of aspects 15 through 28.

Aspect 33: An apparatus for wireless communications at a first device, comprising at least one means for performing a method of any of aspects 15 through 28.

Aspect 34: A non-transitory computer-readable medium storing code for wireless communications at a first device, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Additionally, as used herein, including in the claims, "set" as used as a group of objects (for example, a set of values) indicates a group of multiple (for example, one or more) objects.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first device, comprising:

transmitting, to a second device, a message indicating a set of power amplifier characteristics and a set of power backoff values for each of one or more modulation configurations of the first device, the set of power backoff values being associated with a non-linear region of power amplifier characteristic curves of the first device; and transmitting, to the second device, based at least in part on transmitting the message indicating the set of power amplifier characteristics and the set of power backoff values, signaling using a single carrier waveform at a transmission power in the non-linear region of the power amplifier characteristic curves based at least in part on applying one or more power backoff values of the set of power backoff values.

2. The method of claim 1, wherein the message further comprises an indication of a capability to support transmission with the transmission power in the non-linear region of the power amplifier characteristic curves, wherein transmitting the signaling is based at least in part on having the capability.

3. The method of claim 1, further comprising receiving, from the second device, an indication of a capability for the second device to receive signaling with the transmission power in the non-linear region of the power amplifier characteristic curves, wherein the message indicating the set of power amplifier characteristics and the set of power backoff values is transmitted based at least in part on receiving the indication of the capability.

4. The method of claim 1, wherein the message comprises an indication, for each of a plurality of antenna ports of the first device, for each of a plurality of antenna panels of the first device, for each of a plurality of power amplifiers of the first device, for each of a plurality of polarizations supported at the first device, or for any combination thereof, of a respective set of power amplifier characteristics and a respective set of power backoff values, wherein transmitting the signaling is further based at least in part on the set of power amplifier characteristics and the set of power backoff values associated with an antenna port of the plurality of antenna ports, an antenna panel of the plurality of antenna panels, a power amplifier of the plurality of power amplifiers, a polarization of the plurality of polarizations, or any combination thereof, of the first device.

5. The method of claim 1, wherein the message comprises an indication, for each of a plurality of modulation constellation types, for each of a plurality of modulation orders, for each of a plurality of modulation and coding schemes, for each of a plurality of constellation radii, or for any combination thereof, of a respective set of power amplifier characteristics and a respective set of power backoff values, wherein transmitting the signaling is further based at least in part on the set of power amplifier characteristics and the set of power backoff values associated with a modulation constellation type of the plurality of modulation constellation types, a modulation order of the plurality of modulation orders, a modulation and coding scheme of the plurality of modulation and coding schemes, a constellation radius of the plurality of constellation radii, or any combination thereof, of the first device.

6. The method of claim 1, wherein the message further comprises an indication, for each of the one or more modulation configurations of the first device, of a debiasing factor, wherein transmitting the signaling is further based at least in part on the debiasing factor for a modulation configuration of the one or more modulation configurations.

7. The method of claim 1, wherein the message comprises an indication, for each of a plurality of temperature ranges of a power amplifier of the first device, of a respective set of power amplifier characteristics and a respective set of power backoff values, wherein transmitting the signaling is based at least in part on the set of power amplifier characteristics and the set of power backoff values associated with a temperature range of the power amplifier of the first device.

8. The method of claim 7, further comprising transmitting, to the second device, an indication of a temperature of the power amplifier of the first device.

9. The method of claim 1, further comprising receiving, from the second device, an indication to enable or disable transmission with the transmission power in the non-linear region of the power amplifier characteristic curves.

10. The method of claim 9, wherein the indication to enable or disable transmission with the transmission power in the non-linear region of the power amplifier characteristic curves is received via downlink control information, a medium access control control element, radio resource control signaling, or any combination thereof.

11. The method of claim 9, wherein the indication to enable or disable transmission with the transmission power in the non-linear region is received based at least in part on a transmission rank, a precoding, a geolocation of the first device, an indicated error for the set of power amplifier characteristics and the set of power backoff values, a power sensitivity or battery level of the first device, or any combination thereof.

12. The method of claim 1, further comprising transmitting, to the second device, an indication to enable or disable reception with the transmission power in the non-linear region of the power amplifier characteristic curves.

13. The method of claim 1, further comprising receiving a request from the second device to transmit the message indicating the set of power amplifier characteristics and the set of power backoff values, wherein the message is transmitted based at least in part on receiving the request.

14. The method of claim 1, wherein the message is transmitted via control information signaling, a medium access control control element, radio resource control signaling, or any combination thereof.

15. A method for wireless communications at a first device, comprising:
receiving, from a second device, a message indicating a set of power amplifier characteristics and a set of power backoff values for each of one or more modulation configurations of the second device, the set of power backoff values being associated with a non-linear region of power amplifier characteristic curves of the second device; and
receiving, from the second device based at least in part on receiving the message, signaling using a single carrier waveform at a transmission power in the non-linear region of the power amplifier characteristic curves based at least in part on a modulation configuration of the signaling and the set of power amplifier characteristics and the set of power backoff values.

16. The method of claim 15, wherein the message further comprises an indication of a capability of the second device to support transmission with the transmission power in the non-linear region of the power amplifier characteristic curves.

17. The method of claim 15, further comprising transmitting, to the second device, an indication of a capability to receive signaling with the transmission power in the non-linear region of the power amplifier characteristic curves, wherein the message indicating the set of power amplifier characteristics and the set of power backoff values is received based at least in part on transmitting the indication of the capability.

18. The method of claim 15, wherein the message comprises an indication, for each of a plurality of antenna ports of the second device, for each of a plurality of antenna panels of the second device, for each of a plurality of power amplifiers of the second device, for each of a plurality of polarizations supported at the second device, or for any combination thereof, a respective set of power amplifier characteristics and a respective set of power backoff values, wherein receiving the signaling is based at least in part on the respective set of power amplifier characteristics and the respective set of power backoff values associated with an antenna port of the plurality of antenna ports, an antenna panel of the plurality of antenna panels, a power amplifier of the plurality of power amplifiers, a polarization of the plurality of polarizations, or any combination thereof, of the second device.

19. The method of claim 15, wherein the message comprises an indication, for each of a plurality of modulation constellation types of the second device, for each of a plurality of modulation orders of the second device, for each of a plurality of modulation and coding schemes, for each of a plurality of constellation radii, of the second device, or for any combination thereof, a respective set of power amplifier characteristics and a respective set of power backoff values, wherein receiving the signaling is further based at least in part on the respective set of power amplifier characteristics and the respective set of power backoff values associated with a modulation constellation type of the plurality of modulation constellation types, a modulation order of the plurality of modulation orders, a modulation and coding scheme of the plurality of modulation and coding schemes, a constellation radius of the plurality of constellation radii, or any combination thereof, of the second device.

20. The method of claim 15, wherein the message further comprises an indication, for each of the one or more modulation configurations of the second device, of a debiasing factor, wherein receiving the signaling is further based at least in part on the debiasing factor for a modulation configuration of the one or more modulation configurations.

21. The method of claim 15, wherein the message comprises an indication, for each of a plurality of temperature ranges of a power amplifier of the second device, of a respective set of power amplifier characteristics and a respective set of power backoff values.

22. The method of claim 21, further comprising receiving, from the second device, an indication of a temperature of the power amplifier of the second device.

23. The method of claim 15, further comprising transmitting, to the second device, an indication to enable or disable transmission with the transmission power in the non-linear region of the power amplifier characteristic curves.

24. The method of claim 23, wherein the indication to enable or disable transmission with the transmission power in the non-linear region of the power amplifier characteristic curves is transmitted via downlink control information, a medium access control control element, radio resource control signaling, or any combination thereof.

25. The method of claim 23, wherein the indication to enable or disable transmission with the transmission power in the non-linear region is transmitted based at least in part on a transmission rank, a precoding, a geolocation of the second device, an error for the set of power amplifier characteristics and the set of power backoff values, a power sensitivity or battery level of the second device, or any combination thereof.

26. The method of claim 15, further comprising receiving, from the second device, an indication to enable or disable reception with the transmission power in the non-linear region of the power amplifier characteristic curves.

27. The method of claim 15, further comprising transmitting a request to the second device to transmit the message indicating the set of power amplifier characteristics and the set of power backoff values, wherein the message is received based at least in part on transmitting the request.

28. The method of claim 15, wherein the message is received via control information signaling, a medium access control control element, radio resource control signaling, or any combination thereof.

29. An apparatus for wireless communications at a first device, comprising:
    at least one processor; and
    at least one memory coupled with the at least one processor, the at least one memory storing instructions executable by the at least one processor to cause the first device to:
        transmit, to a second device, a message indicating a set of power amplifier characteristics and a set of power backoff values for each of one or more modulation configurations of the first device, the set of power backoff values being associated with a non-linear region of power amplifier characteristic curves of the first device; and
        transmit, to the second device, based at least in part on transmitting the message indicating the set of power amplifier characteristics and the set of power backoff values, signaling using a single carrier waveform at a transmission power in the non-linear region of the power amplifier characteristic curves based at least in part on one or more power backoff values of the set of power backoff values.

30. An apparatus for wireless communications at a first device, comprising:
    at least one processor; and
    at least one memory coupled with the at least one processor, the at least one memory storing instructions executable by the at least one processor to cause the first device to:
        receive, from a second device, a message indicating a set of power amplifier characteristics and a set of power backoff values for each of one or more modulation configurations of the second device, the set of power backoff values being associated with a non-linear region of power amplifier characteristic curves of the second device; and
        receive, from the second device based at least in part on receiving the message, signaling using a single carrier waveform at a transmission power in the non-linear region of the power amplifier characteristic curves based at least in part on a modulation configuration of the signaling and the set of power amplifier characteristics and the set of power backoff values.

* * * * *